US 6,665,444 B1

(12) United States Patent
Kajiwara

(10) Patent No.: US 6,665,444 B1
(45) Date of Patent: Dec. 16, 2003

(54) IMAGE PROCESSING APPARATUS AND METHOD, AND STORAGE MEDIUM

(75) Inventor: Hiroshi Kajiwara, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/558,654

(22) Filed: Apr. 26, 2000

(30) Foreign Application Priority Data

Apr. 28, 1999 (JP) .......................................... 11-121604
Jan. 14, 2000 (JP) ....................................... 2000-005633

(51) Int. Cl.[7] .................................................. G06K 9/36
(52) U.S. Cl. ....................... 382/240; 382/233; 382/239; 382/248; 708/203
(58) Field of Search ................................. 382/239, 240, 382/248, 244, 233, 260; 358/426.11, 434, 539; 708/203

(56) References Cited

U.S. PATENT DOCUMENTS

| | | | | |
|---|---|---|---|---|
| 5,275,164 A | * | 1/1994 | Maeda et al. ............. 128/653.2 |
| 5,649,077 A | * | 7/1997 | On et al. ..................... 395/119 |
| 5,838,825 A | * | 11/1998 | Obayashi et al. ............ 382/233 |
| 5,894,430 A | * | 4/1999 | Ohara .................... 364/725.03 |
| 5,945,930 A | | 8/1999 | Kajiwara ...................... 341/50 |
| 6,028,963 A | | 2/2000 | Kajiwara .................... 382/239 |
| 6,031,938 A | | 2/2000 | Kajiwara .................... 382/239 |
| 6,229,927 B1 | * | 5/2001 | Schwartz .................... 382/248 |
| 6,263,109 B1 | * | 7/2001 | Ordentlich et al. ......... 382/232 |
| 6,567,562 B1 | * | 5/2003 | Nakayama et al. ......... 382/246 |

OTHER PUBLICATIONS

Mojsilovie et al., "Classification of the Ultrasound Liver Images with the 2Nx1–D Wavelet Transform", IEEE, International Conference on Image Processing, vol. 1, Sep. 1996, pps. 367–370.*

W. Sweldens, The Lifting Scheme: A Construction of Second Generation Wavelets, SIAM Math. Anal., vol. 29, No. 2, Mar. 1998, pp. 11–546.

* cited by examiner

Primary Examiner—Anh Hong Do
(74) Attorney, Agent, or Firm—Fitzpatrick, Cella, Harper & Scinto

(57) ABSTRACT

In accordance with this invention, when an image is compressed using a wavelet transform, the amount of memory storage capacity required for performing the transform is minimized. An image processing apparatus according to this transforming, in a one-dimensional direction, image data to be coded; a second transform unit for frequency-transforming, in a different one-dimensional direction, and at least some of the frequency components obtained by the first transform unit; and a coding unit for entropy-coding those ones of the frequency components which are not frequency-transformed by the second transform unit among the frequency components obtained by the first transform unit, and for entropy-coding frequency components obtained by the second transform unit.

16 Claims, 19 Drawing Sheets

FIG. 5 DISCRETE WAVELET TRANSFORM IN VERTICAL DIRECTION

| v \ k | 0 VARIABLE-LENGTH PART | 0 FIXED-LENGTH PART | 1 VARIABLE-LENGTH PART | 1 FIXED-LENGTH PART | 2 VARIABLE-LENGTH PART | 2 FIXED-LENGTH PART | 3 VARIABLE-LENGTH PART | 3 FIXED-LENGTH PART |
|---|---|---|---|---|---|---|---|---|
| 0 | 1 | | 1 | 0 | 1 | 00 | 1 | 000 |
| 1 | 01 | | 1 | 1 | 1 | 01 | 1 | 001 |
| 2 | 001 | | 1 | 0 | 1 | 10 | 1 | 010 |
| 3 | 0001 | | 1 | 1 | 1 | 11 | 1 | 011 |
| 4 | 00001 | | 01 | 0 | 01 | 00 | 1 | 100 |
| 5 | 000001 | | 01 | 1 | 01 | 01 | 1 | 101 |
| 6 | 0000001 | | 0001 | 0 | 01 | 10 | 1 | 110 |
| 7 | 00000001 | | 0001 | 1 | 01 | 11 | 1 | 111 |
| 8 | 000000001 | | 00001 | 0 | 001 | 00 | 01 | 000 |
| ... | | | | | | | | |

FIG. 7

FIG. 17 DISCRETE WAVELET TRANSFORM IN VERTICAL DIRECTION

|   | 0 | | 1 | | 2 | | 3 | |
|---|---|---|---|---|---|---|---|---|
|   | VARIABLE-LENGTH PART | FIXED-LENGTH PART | VARIABLE-LENGTH PART | FIXED-LENGTH PART | VARIABLE-LENGTH PART | FIXED-LENGTH PART | VARIABLE-LENGTH PART | FIXED-LENGTH PART |
| 0 | 1 |  | 1 | 0 | 1 | 00 | 1 | 000 |
| 1 | 01 |  | 1 | 1 | 1 | 01 | 1 | 001 |
| 2 | 001 |  | 01 | 0 | 1 | 10 | 1 | 010 |
| 3 | 0001 |  | 01 | 1 | 1 | 11 | 1 | 011 |
| 4 | 00001 |  | 001 | 0 | 01 | 00 | 1 | 100 |
| 5 | 000001 |  | 001 | 1 | 01 | 01 | 1 | 101 |
| 6 | 0000001 |  | 0001 | 0 | 01 | 10 | 1 | 110 |
| 7 | 00000001 |  | 0001 | 1 | 01 | 11 | 1 | 111 |
| 8 | 000000001 |  | 00001 | 0 | 001 | 00 | 01 | 000 |
| ... | ... |  |  |  |  |  |  |  |

FIG. 19

IMAGE PROCESSING APPARATUS AND METHOD, AND STORAGE MEDIUM

BACKGROUND OF THE INVENTION

1. Field of the Invention

The present invention relates to an image processing apparatus and method for compressing image data, and a storage medium storing this method.

2. Description of the Related Art

In recent years, improved image processing techniques have increased the resolution of image input apparatuses, and therefore also have caused an associated increase in the size of image data being processed. As a result, the memory capacity required for storing such image data has also become larger, and it now generally takes a greater amount of time than was previously required to transmit the image data via a communication line.

However, since the image data has redundancy, the elimination of this redundancy allows the amount of data to be reduced. Accordingly, before image data is stored or transmitted, image compression and coding is performed to eliminate the redundancy possessed by the image data, and to delete a selected amount of information to an extent that deterioration of image quality is difficult to recognize visually.

In recent years, image compression and coding using wavelet transforms has attracted attention. For example, in image compression and coding, an image to be coded is subjected to a wavelet transform in order to be divided into a plurality of frequency bands (sub-bands), after which the transform coefficients of each frequency band are quantized, and the quantization results are entropy-coded.

An example of a known method for performing a wavelet transform to image data is shown in FIGS. 9A, 9B, 9C, and 9D. The method includes steps of separating high-frequency components (H) and low-frequency components (L) by performing one-dimensional filtering (FIG. 9B) on the original image (FIG. 9A), performing one-dimensional filtering (FIG. 9C) in the vertical direction, causing the image to be divided into four sub-bands LL, LH, HL, and HH, and then repeating a similar four-division process (FIG. 9D) on the sub-band LL1 corresponding to the low-frequency components. FIG. 10 shows an example of a case in which the above-described two-dimensional wavelet transform is repeated three times.

Conventionally, in order to perform such a wavelet transform, a process was performed in which an image to be coded for one screen, such as that shown in FIG. 9A, is held in a memory, and then each time the process proceeds to FIGS. 9B and 9C, the original memory is replaced with the new data. As a result, a buffer that is large enough for storing one screen (the size of the image on which a wavelet transform was performed a first time) is required at a minimum.

However, there is a problem in that the use of such a memory for storing one screen increases the expense of the image processing apparatus. Therefore, it would be desirable to overcome that problem and to minimize the amount of memory capacity required for performing a wavelet transform.

SUMMARY OF THE INVENTION

The present invention solves the above-described problems. It is an object of the present invention to minimize the amount of memory storage capacity required for compressing an image using a wavelet transform.

To achieve the above-mentioned object, according to one aspect of the present invention, an image processing apparatus is provided, comprising: a first transform unit for frequency-transforming, in a one-dimensional direction, image data to be coded; a second transform unit for frequency-transforming, in a different one-dimensional direction, at least some of the frequency components obtained by the first transform unit; and a coding unit for entropy-coding those ones of the frequency components which are not frequency-transformed by the second transform unit among the frequency components obtained by the first transform unit, and for entropy-coding the frequency components obtained by the second transform unit.

According to another aspect of the present invention, an image processing apparatus is provided, comprising: a detection unit for detecting the size of image data to be coded; a first transform unit for frequency-transforming, in a one-dimensional direction, image data to be coded; a second transform unit for further frequency-transforming all of the frequency components obtained by the first transform unit in a different one-dimensional direction, when the detected size is smaller than a predetermined size, and for further frequency-transforming, in the different one-dimensional direction, at least some of the frequency components obtained by the first transform unit, when the detected size is larger than the predetermined size; and a coding unit for entropy-coding the frequency components obtained by the second transform unit. The coding unit also entropy-codes the frequency components which were not frequency transformed by the second transform unit, but which were obtained by the first transform unit.

According to another aspect of the present invention, an image processing apparatus is provided, comprising: an input unit for inputting, a plurality of times, same image data to be coded; a first transform unit for frequency-transforming, in a one-dimensional direction, the image data input from the input unit an n-th time in order to obtain a first frequency component; a second transform unit for frequency-transforming, in the one-dimensional direction, the image data input from the input unit an m-th time (M being greater than N), in order to obtain a second frequency component; a storage unit for selectively storing either one of the first and second frequency components; and a third transform unit for frequency-transforming, in a different one-dimensional direction, one of the first and second frequency components stored in the storage unit.

The above and further objects, aspects and novel features of the invention will become more apparent from the following detailed description when read in conjunction with the accompanying drawings.

BRIEF DESCRIPTION OF THE DRAWINGS

FIG. 7 shows the correspondence of Golomb codes with respect to a k parameter;

FIG. 19 shows examples of Golomb codes when the k parameter is 0 to 3; and

DESCRIPTION OF THE PREFERRED EMBODIMENTS

The preferred embodiments of the present invention will now be described herein below in sequence.

First Embodiment

A first embodiment of the present invention will first be described.

Figure 1:
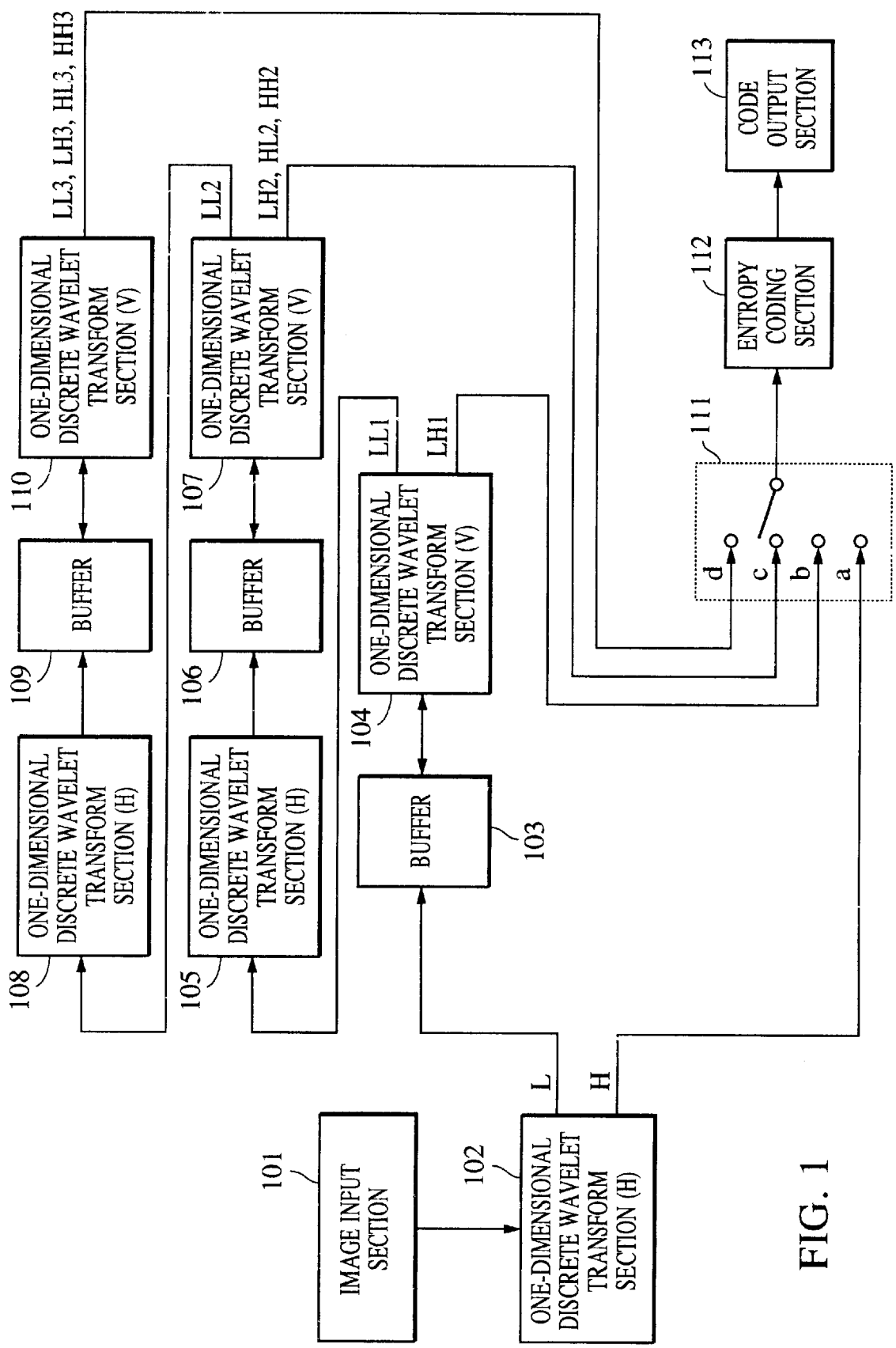
FIG. 1 is a block diagram of an apparatus according to a first embodiment of the present invention.

FIG. 1 is a block diagram of an image processing apparatus according to a first embodiment of the present invention. Referring to FIG. 1, reference numeral 101 denotes an image input section, which corresponds to a data input section of, for example, a camera, a scanner, or an external apparatus. Reference numerals 102, 105, and 108 denote one-dimensional discrete wavelet transform sections for performing respective horizontal discrete wavelet transforms. Reference numerals 103, 106, and 109 denote buffers for temporarily storing an amount of image data required for use at subsequent stages. Reference numerals 104, 107, and 110 denote one-dimensional discrete wavelet transform sections for performing respective vertical discrete wavelet transforms. Also, reference numeral 111 denotes a switch, reference numeral 112 denotes an entropy coding section, and reference numeral 113 denotes a code output section.

In the representation in the figures, the horizontal one-dimensional discrete wavelet transform sections 102, 105, and 108 are distinguished from the vertical one-dimensional discrete wavelet transform sections 104, 107, and 110 by (H) or (L), respectively.

In this embodiment, a description is given assuming that monochrome image data is to be coded, with one pixel being eight bits long. However, the present invention is not limited to this example, and can be applied to a case in which a pixel value is represented by a number of bits other than eight bits, such as 4, 10, or 12 bits, and to a case in which a color multi-level image formed by a plurality of multi-level components is to be coded. Also, the present invention can be applied to a case in which multi-level information indicating the state of each pixel in an image area is to be coded, such as in a case in which an index value is to be coded, where the color of each pixel is represented by a color table. Also, the size of image data to be coded in this embodiment is assumed to be fixed, and the number of pixels in the horizontal direction is denoted as X and the number of pixels in the vertical direction is denoted as Y. For simplicity of description, in this embodiment, a description is given assuming that both X and Y are multiples of 8.

The operation of each section shown in FIG. 1 of this embodiment is described below in detail. Before a coding process starts, the switch 111 is assumed to be in a position for connecting switch terminal "a" to section 112.

Initially, image data representing an image to be coded is input from the image input section 101 in a raster scan order. In the one-dimensional discrete wavelet transform section 102, a horizontal wavelet transform is performed in sequence to the image data input from the image input section 101 so that the image data is divided into a low-frequency sub-band (L) and a high-frequency sub-band (H).

In this embodiment, a discrete wavelet transform is performed based on the following equations (1) and (2):

$$r_n = \text{floor}\,[(x_{2n}+x_{2n+1})/2] \qquad (1)$$

$$d_n = (x_{2n+2}-x_{2n+3}) + \text{floor}\,[(-r_n+r_{n+2}+2)/4] \qquad (2)$$

where $r_n$ is the coefficient of the n-th low-frequency sub-band obtained after the one-dimensional discrete wavelet transform is performed, $d_n$ is the coefficient of the n-th high-frequency sub-band obtained after the one-dimensional discrete wavelet transform is performed, $x_n$ is the n-th coefficient in the one-dimensional image data to be coded, and floor $[x_n]$ indicates a maximum integer which does not exceed $x_n$.

Also, in the horizontal one-dimensional discrete wavelet transform sections 105 and 108 (to be described later) and the vertical one-dimensional discrete wavelet transform sections 104, 107, and 110 (to be described later) a wavelet transform is performed, in a manner similar to that described above, using equations (1) and (2). However, in this case, it is assumed that $x_n$ which is to be transformed, is a transform coefficient obtained after at least one horizontal wavelet transform is performed, and also is the n-th coefficient among the one-dimensional transform coefficients which become transformed in sequence.

In each of the equations described above, one coefficient of the low-frequency sub-band or the high-frequency sub-band is generated for every two pieces of data ($x_{2n}$ and $x_{2n+1}$, or $x_{2n+2}$ and $x_{2n+3}$) transformed. Therefore, the number of coefficients of the low-frequency sub-band and the high-frequency sub-band, obtained after the one-dimensional discrete wavelet transform is performed, becomes equal to the amount (number) of image data for the objects of transformation or the number of transform coefficients, as can be understood from FIGS. 9A to 9D.

Next, each coefficient which is a constituent of the low-frequency sub-band L, obtained by the first one-dimensional discrete wavelet transform section 102, is stored in the buffer 103. On the other hand, the coefficient of the high-frequency sub-band H is passed directly to the entropy coding section 112 via the switch 111.

Figure 2:
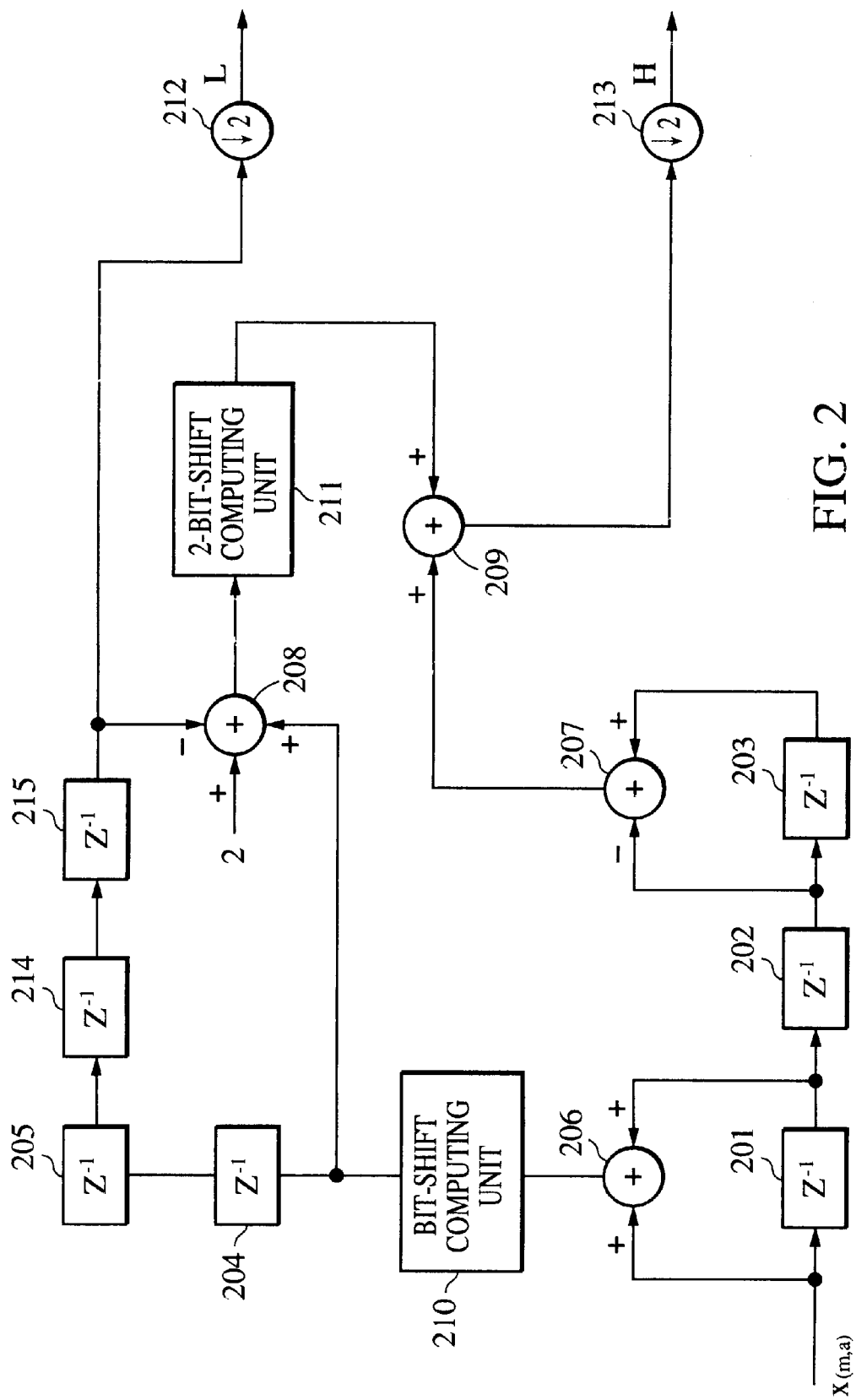
FIG. 2 shows the internal construction of a horizontal one-dimensional discrete wavelet transform section 102.

FIG. 2 shows the internal construction of the one-dimensional discrete wavelet transform section 102 which performs the transform. In FIG. 2, reference numerals 201, 202, 203, 204, 205, 214, and 215 denote pixel delay circuits for one pixel of interest. Reference numerals 206, 207, 208, and 209 denote adders. Reference numeral 210 denotes a bit-shift computing unit for shifting bit information to the right by one bit. Reference numeral 211 denotes a bit-shift computing unit for shifting bit information to the right by two bits, and reference numerals 212 and 213 denote 2:1 down sampling circuits. In some embodiments, special processing operations may be necessary for the left and right ends of the image. However, such processing operations are not considered germane to the present invention, and thus a detailed description thereof will not be provided herein.

With respect to pixel values $x_{(m,a)}$ ("m" is a number of pixels in the horizontal direction, in a range from 0 to X–1, and "a" is a constant within the range 0 to Y–1 of the number of pixels in the vertical direction) for one line of the image data which is input in a raster scan sequence to the one-dimensional discrete wavelet transform section 102, four consecutive pixel values $x_{(m+2,a)}$, $x_{(m+3,a)}$, $x_{(m+4,a)}$, and $x_{(m+5,a)}$ are extracted by the pixel delay circuits 201 to 203, $x_{(m+4,a)}+x_{(m+5,a)}$ is determined by the adder 206, and $x_{(m+2,a)}-x_{(m+3,a)}$ is determined by the adder 207. In the bit-shift computing unit 210, the computation result of the adder 206 is then shifted by one bit to the right (corresponding to a process of multiplying by ½ and then discarding the decimals). The image data is then delayed by four pixels by the pixel delay circuits 204, 205, 214, and 215. The adder 208 thereafter determines a value by subtracting the output of the pixel delay circuit 215 from the computation result of the bit-shift computing unit 210, and 2 is added thereto. The resulting value is then shifted to the right by two bits (corresponding to a process for multiplying by ¼ and then discarding the decimals) in the bit-shift computing unit 211, and thereafter, the adder 209 adds the computation result of the adder 207 to the computation result of the bit-shift computing unit 211. The down sampling circuits 212 and 213 reduce the output of the pixel delay circuit 215 and the adder 209, respectively, by one half, and then output them as a coefficient $r_{(m,a)}$ of the low-frequency sub-band and a coefficient $d_{(m,a)}$ of the high-frequency sub-band, respectively.

Figure 4:
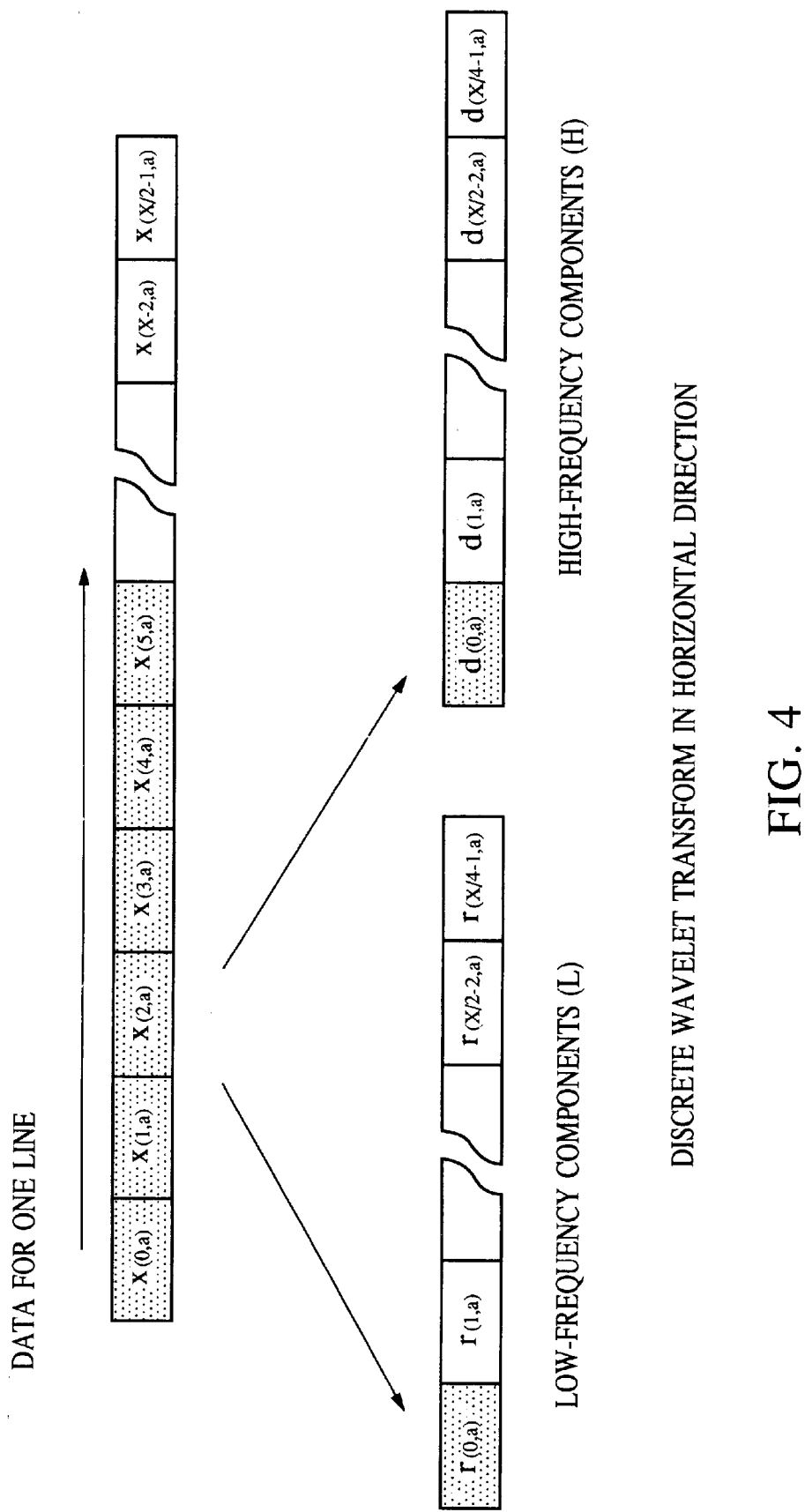
FIG. 4 shows a state of a horizontal one-dimensional discrete wavelet transform.

FIG. 4 shows a state, in which data $x_{(0,a)}$ to $x_{(X-1,a)}$ for one line in the horizontal direction is subjected to a one-dimensional discrete wavelet transform with respect to that direction, and coefficients $r_{(0,a)}$ to $r_{((X/2)-1,a)}$ of the low-frequency sub-band for one line and coefficients $d_{(0,a)}$ to $d_{((X/2)-1,a)}$ of the high-frequency sub-band for one line are generated, in the above-described manner.

The buffer 103 (FIG. 1) for storing the coefficients of the low-frequency sub-band L preferably has a capacity for storing at least one half of the number of pixels X in the horizontal direction of the image; that is, a capacity of at least N times X/2. N represents the number of lines containing the upper and lower lines which become necessary when a discrete wavelet transform in the vertical direction is performed, and, in this preferred embodiment N=6, which corresponds to the number of longest taps of a filter used in this transform.

In a case where coefficients $r_{(0,m)}$ to $r_{((X/2)-1,m+5)}$ for six lines are stored in this buffer 103 (wherein a first one of the six lines is the m-th (m is an even number) line of the low-frequency sub-band L generated by the one-dimensional discrete wavelet transform section 102), and a vertical discrete wavelet transform is later performed by the one-dimensional discrete wavelet transform section 104 on each coefficient output from the buffer 103, then coefficients for one line in a low-frequency sub-band LL1 and a high-frequency sub-band LH1 with respect to the vertical direction are generated. In this generation method, a process similar to the above-described discrete wavelet transform in the horizontal direction is performed in the vertical direction. The LL1 components generated by section 104 here are then sent to the one-dimensional discrete wavelet transform section 105, and the LH1 components are passed to the entropy coding section 112 via the switch 111, without being further subjected to a discrete wavelet transform. The switch 111 is controlled so as to connect switch terminal "b" to section 112 in synchronization with the generation of LH1.

Figure 3:
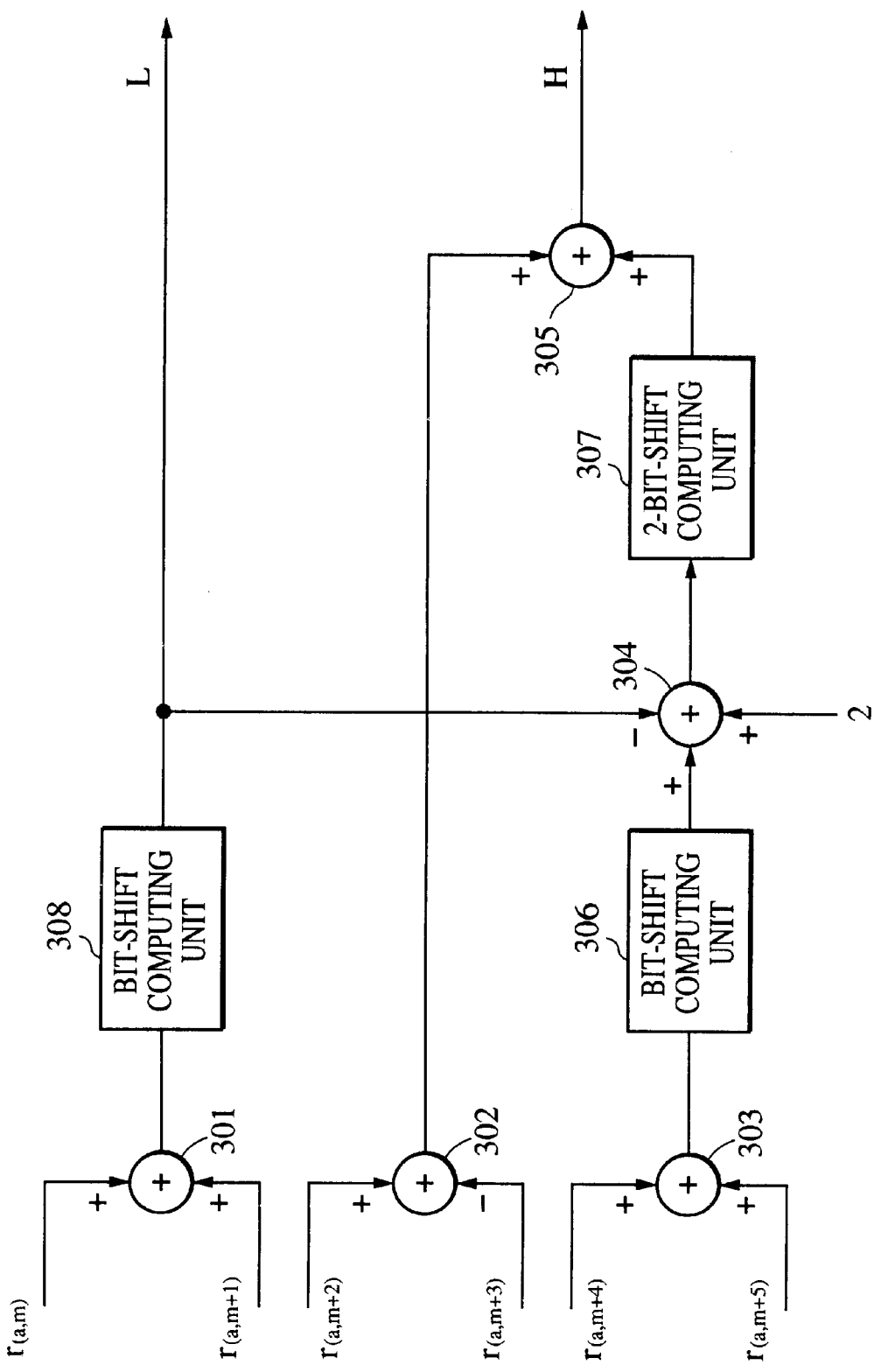
FIG. 3 shows the internal construction of a vertical one-dimensional discrete wavelet transform section 104.

FIG. 3 shows the internal construction of the one-dimensional discrete wavelet transform section 104 of FIG. 1. In FIG. 3, reference numerals 301, 302, 303, 304, and 305 denote adders. Reference numerals 306 and 308 denote bit-shift computing units for shifting bit information to the right by one bit, and reference numeral 307 denotes a bit-shift computing unit for shifting bit information to the right by two bits. Initially, six coefficients $r_{(a,m)}$, $r_{(a,m+1)}$, $r_{(a,m+2)}$, $r_{(a,m+3)}$, $r_{(a,m+4)}$, and $r_{(a,m+5)}$, which are consecutive in the vertical direction, are input to the components 301, 302, and 303, respectively, as shown in FIG. 3.

In the case of the one-dimensional discrete wavelet transform section 104, these data are read from the buffer 103. The adders 301, 302, and 303 determine $r_{(a,m)}+r_{(a,m+1)}$, $r_{(a,m+2)}-r_{(a,m+3)}$, and $r_{(a,m+4)}+r_{(a,m+5)}$, respectively. The bit-shift computing units 308 and 306 shift to the right, by one bit, the computation results of the adders 301 and 303, respectively. The adder 304 subtracts the output of the bit-shift computing unit 308 from the output of the bit-shift computing unit 306, and 2 is further added thereto. The output of the adder 304 is then shifted to the right by two bits by the bit-shift computing unit 307, and the adder 305 then adds the output of the adder 302 to the output of the bit-shift computing unit 307, and outputs the result as a coefficient of the high-frequency sub-band. On the other hand, the output of the bit-shift computing unit 308 is directly output as a coefficient of the low-frequency sub-band.

Figure 5:
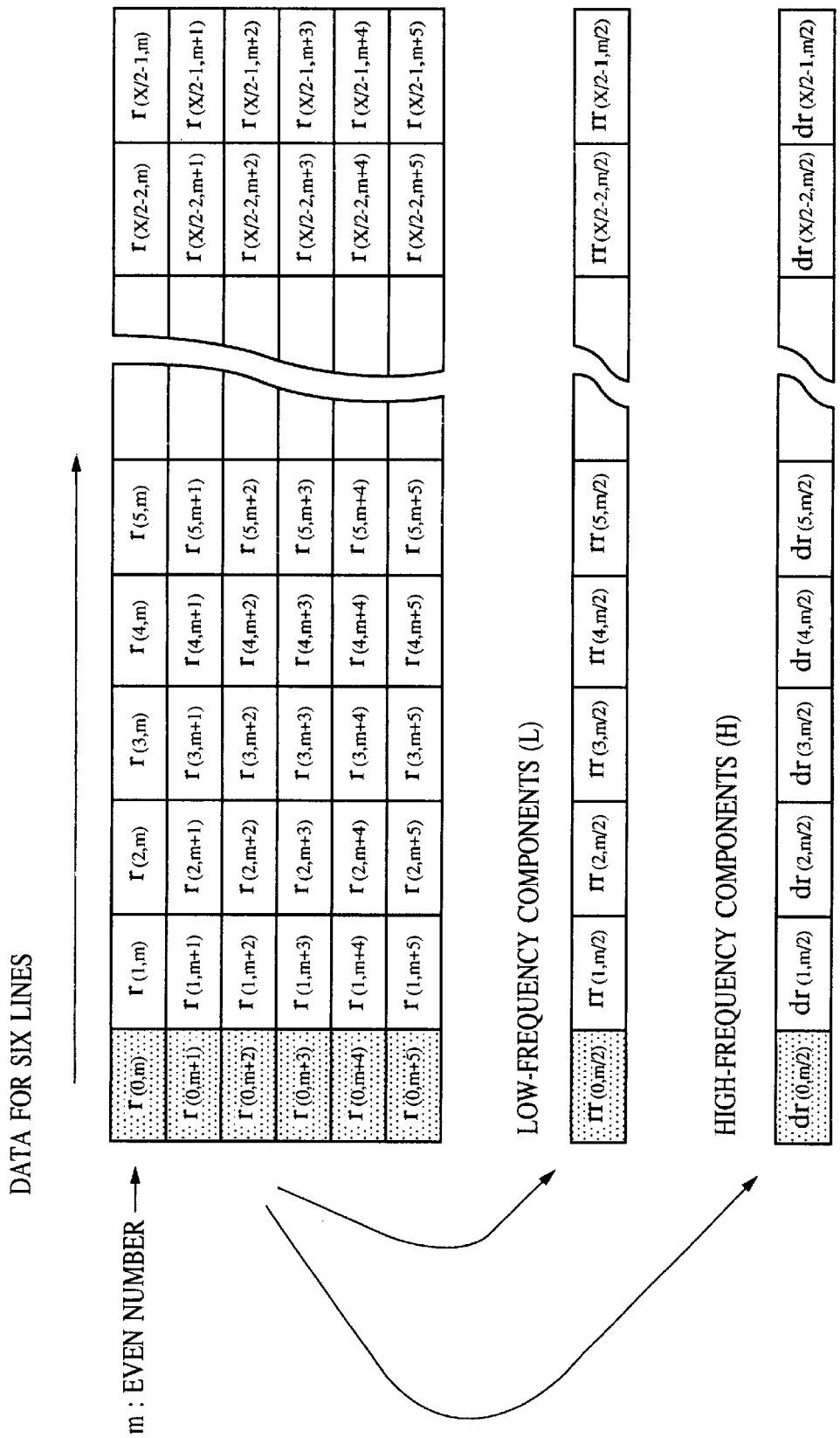
FIG. 5 shows a state of a vertical one-dimensional discrete wavelet transform.

An example of a state is shown in FIG. 5, in which, in the above-described manner, data $r_{(0,m)}$ to $r_{((X/2)-1,m+5)}$ for six lines for the low-frequency components in the horizontal direction is subjected to a one-dimensional discrete wavelet transform in the vertical direction, so that coefficients $rr_{(0,m/2)}$ to $rr_{((X/2)-1,m/2)}$ (which constitute the low-frequency sub-band LL1) for one line and coefficients $dr_{(0,m/2)}$ to $dr_{((X/2)-1,m/2)}$ (which constitute the high-frequency sub-band LH1) for one line are generated.

The one-dimensional discrete wavelet transform section 105 further performs a horizontal one-dimensional discrete wavelet transform to each coefficient which is a constituent of the sub-band LL1, which represents the low-frequency components for both the horizontal and vertical directions, generated by the one-dimensional discrete wavelet transform section 104. The method performed by this one-dimensional discrete wavelet transform section 105 is the same as the operation of the one-dimensional discrete wavelet transform section 102, differing only in size, and thus a detailed description thereof is omitted herein. Also, both of the coefficients which constitute the low-frequency sub-band and the coefficients which constitute the high-frequency sub-band, obtained by the one-dimensional discrete wavelet transform section 105, are stored in the buffer 106 in order to perform a vertical discrete wavelet transform at a subsequent stage.

Figure 6:
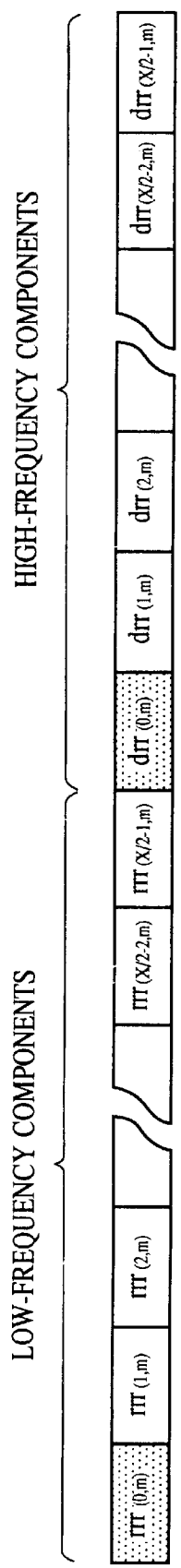
FIG. 6 shows a state in which coefficients are stored in a buffer 806.

The storage of data in the buffer 106 is performed in such a manner that, as shown in FIG. 6 for one line, the data is arranged in the sequence of low-frequency components $rrr_{(0,m)}$ to $rrr_{((X/4)-1,m+5)}$ and high-frequency components $drr_{(0,m)}$ to $drr_{((X/4)-1,m+5)}$.

Such a process for buffering both the low-frequency components and the high-frequency components is important for performing a further discrete wavelet transform in the vertical direction for both components at a subsequent stage. However, in the case of the high-frequency components H obtained by the one-dimensional discrete wavelet transform section 102 in the initial period, when the high-frequency components H are stored together with the low-frequency sub-band L in the buffer 103 in order to perform the discrete wavelet transform in the vertical direction, the storage capacity of the buffer 103 must be substantially increased. Therefore, in this embodiment, a sub-band division which performs coding without performing another discrete wavelet transform in the vertical direction is performed on the high-frequency components obtained by the one-dimensional discrete wavelet transform section 102.

As is clear from the foregoing description, the buffer 106 has the same amount of capacity as that of the buffer 103.

The subsequent process performed by the one-dimensional discrete wavelet transform section 107 is the same as the process of the one-dimensional discrete wavelet transform section 104 described above, except that the high-frequency components which are subjected to the one-dimensional discrete wavelet transform in the horizontal direction are also subjected to a wavelet transform in the vertical direction.

Therefore, when each coefficient of the low-frequency components and the high-frequency components obtained in the one-dimensional discrete wavelet transform section 107 (by subjecting the low-frequency sub-band LL1 to the one-dimensional discrete wavelet transform in the horizontal direction) is stored in the buffer 106, for six lines (where a first one of those lines is the m-th line (m is an integer)), the discrete wavelet transform in the vertical direction is performed on the coefficients stored in the buffer 106.

Figure 9D:
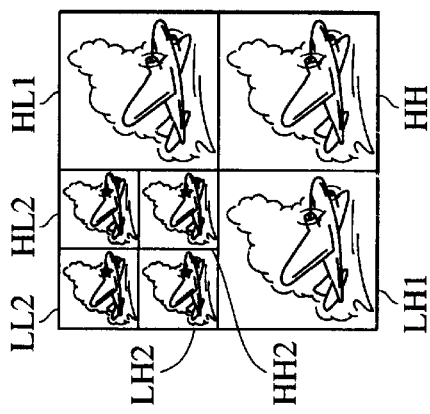
FIGS. 9A, 9B, 9C, and 9D show an exemplary process of a two-dimensional discrete wavelet transform.
Figure 9C:
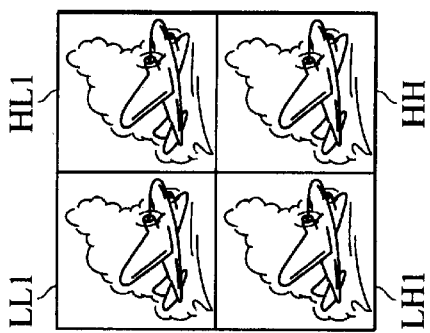
Figure 9B:
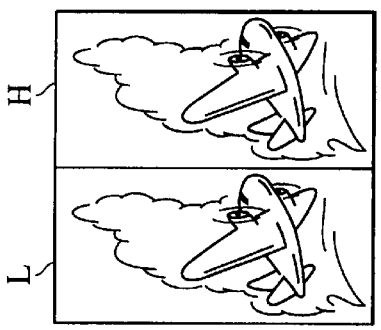
Figure 9A:
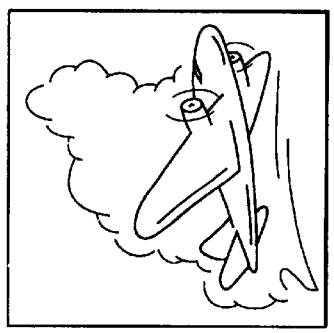

As a result, each coefficient generates a sub-band similar to the four frequency bands LL2, LH2, HL2, and HH2 of FIG. 9D. That is, the process of sub-band division shown in FIG. 12 is performed. The low-frequency sub-band LL2 which is obtained here is then sent to the one-dimensional discrete wavelet transform sections 108 and 110, wherein discrete wavelet transforms in the respective horizontal and vertical directions are further performed. The other sub-bands LH2, HL2, and HH2 are sent to the entropy coding section 112 via the switch 111, which is controlled so as to connect switch terminal "c" to section 112 in synchronization with the generation of the LH2, HL2, and HH2 sub-bands.

A transform process is not performed in the one-dimensional discrete wavelet transform section 107 in cases where the coefficients for six lines stored in the buffer 106 are stored with an odd-numbered line being at the start. As a result, the number of the transform coefficients of the original data to be transformed becomes equal to the number of transform coefficients obtained after the wavelet transform.

A process similar to that described above for the one-dimensional discrete wavelet transform section 105, the buffer 106, and the one-dimensional discrete wavelet transform section 107, is also performed to the low-frequency sub-band LL 2, generated by section 107, the one-dimensional discrete wavelet transform section 108, the buffer 109, and the one-dimensional discrete wavelet transform section 110, respectively, to thereby cause the data to be further divided into four frequency bands LL3, LH3, HL3, and HH3. In this embodiment, since a case is described in which the lowest frequency components for both the horizontal and vertical directions are obtained by three wavelet transforms in the horizontal and vertical directions, the four sub-bands LL3, LH3, HL3, and HH3 which are generated are directly output to the entropy coding section 112 at a subsequent stage via a terminal "d" of the switch 111. However, the present invention is not limited to this example, and, in other embodiments, wavelet transforms in the horizontal and vertical directions may be performed three or more times.

Since the size of the data processed by the components from the one-dimensional discrete wavelet transform section 108 to the one-dimensional discrete wavelet transform section 110 is one half the size of data processed by the components from the one-dimensional discrete wavelet transform section 105 to the one-dimensional discrete wavelet transform section 107, the buffer 109 needs only half of the amount of storage capacity of that of the buffer 106.

Next, the entropy coding section 112 uses a Golomb code to code the coefficients for one line of each sub-band, which are input to the coding section 112 via the switch 111. The Golomb code is a coding scheme for non-negative integer values. The scheme is capable of efficiently generating codes corresponding to several types of probability distributions by appropriately determining a coding parameter (denoted as a k parameter). In this embodiment, the k parameter is preferably selected so that the code length becomes shortest for each coefficient for one line which is a constituent of each sub-band. After a coefficient (denoted as C) is transformed into a non-negative integer value (denoted as V) by the following equation (3), Golomb coding is performed based on the selected k parameter.

$$V = \begin{cases} 2*C & \text{(when } C \geq 0) \\ -2*C-1 & \text{(when } C < 0) \end{cases} \quad (3)$$

The selected k parameter is transmitted by being contained in the code stream. The procedure for Golomb-coding the non-negative integer value V to be coded by using the k parameter is performed as follows.

Initially, V is shifted to the right by k bits and an integer value m is determined. The codes for V are formed of a combination of "1", following m "zeros" and the k low-order bits of V. FIG. 7 shows an example of a Golomb code when k=0, 1, 2, and 3.

The final coded data in this embodiment is passed to the code output section 113. The code output section 113 may include, for example, a storage device, such as a hard disk or a memory, or an interface of a network line, etc. The coded data is stored in section 113 or is transmitted on a transmission line (not shown).

The switch 111 is preferably switched according to the exchange of data, on a line-by-line basis, under the the control of a control apparatus (not shown), which also controls the data storage operations and other overall operations of the apparatus of FIG. 1.

Also, if necessary, to enable accurate decoding to be performed on the decoding side, image size information, information for the color components, etc., may be added as additional information for the final coded data.

The coding process (using the wavelet transform) described above makes it possible to minimize or at least reduce the amount of buffer storage capacity required for performing a wavelet transform (normally required to be at least the size of the image to be coded). In the above embodiment, since the coefficients of a high-frequency sub-band, obtained from the one-dimensional discrete wavelet transform section 102, are directly passed to the coding process at a subsequent stage, the required amount of buffer storage capacity (for buffer 103) can be reduced to one half of that of a conventional one.

Second Embodiment

A second embodiment of the present invention will now be described with reference to the drawings.

The description of this embodiment assumes that monochrome image data is to be coded, and that one pixel is eight bits in length. However, the present invention is not limited to this example, and can be applied to a case in which a pixel value is represented by a number of bits other than eight bits, such as 4, 10, or 12 bits, and also to a case in which a color multi-level image formed by a plurality of multi-level components is to be coded. Also, the present invention can be applied to a case in which multi-level information indicating the state of each pixel in an image area is to be coded, such as in a case in which an index value is to be coded, where the color of each pixel is represented by a color table.

Although the size of image data to be coded in the first embodiment was fixed, in the present embodiment, the maximum of the number of pixels of an image to be handled in the horizontal direction is denoted as $X_m$ so that images of various sizes can be handled. The number of pixels of an image to be coded in the horizontal direction is denoted as X, and the number of pixels thereof in the vertical direction is denoted as Y. However, for simplicity of description, in this embodiment, it is assumed that both X and Y are multiples of 8.

Figure 8:
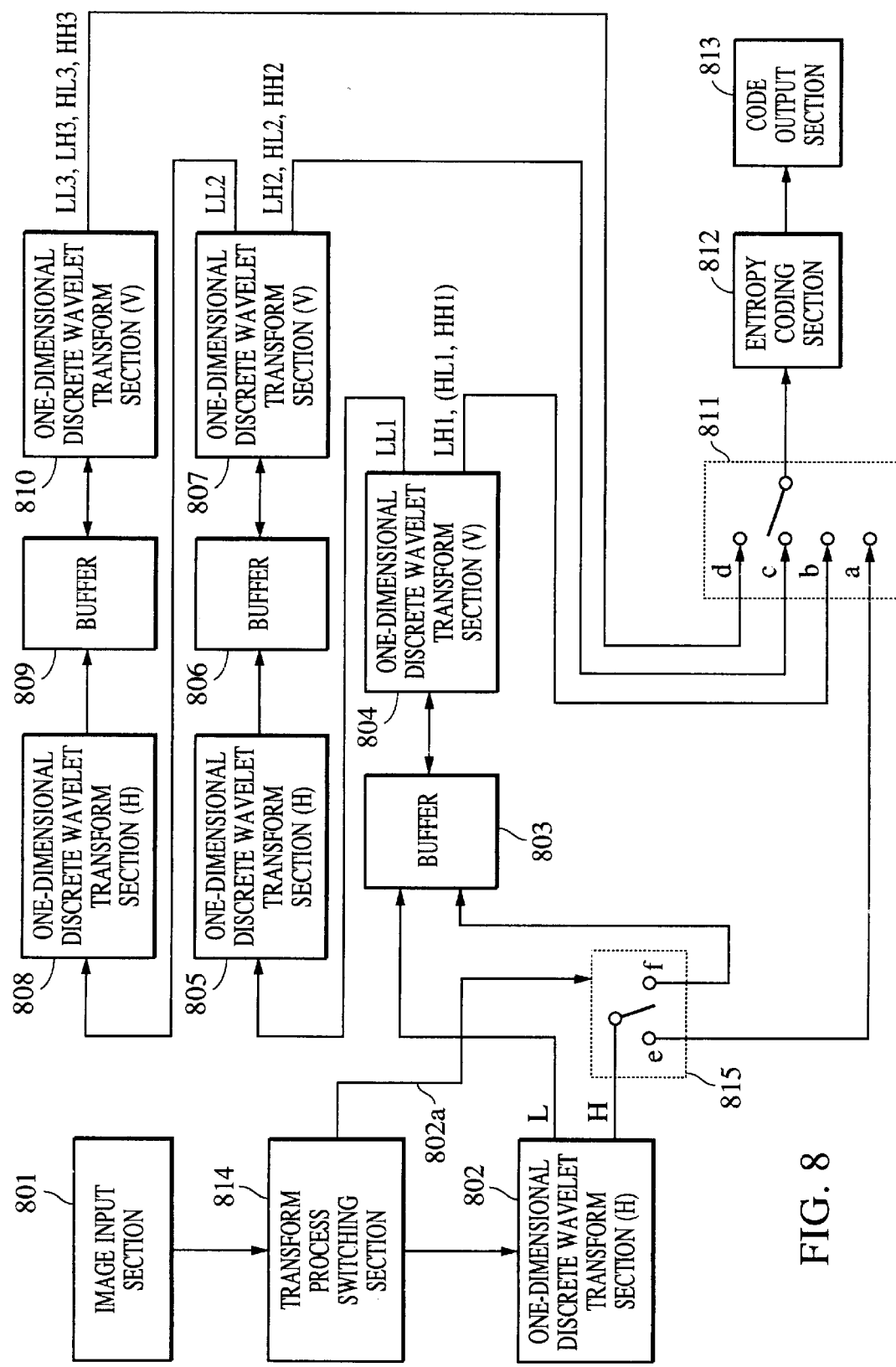
FIG. 8 is a block diagram of an apparatus according to a second embodiment of the present invention.

FIG. 8 shows a block diagram of an image processing apparatus according to the second embodiment of the present invention.

Referring to FIG. 8, reference numeral 801 denotes an image input section. Also, reference numerals 802, 805, and 808 denote one-dimensional discrete wavelet transform sections for performing a horizontal wavelet transform, and reference numerals 803, 806, and 809 denote buffers for temporarily storing an amount of image data required for use at subsequent stages, and reference numerals 804, 807, and 810 denote one-dimensional discrete wavelet transform sections for performing a vertical wavelet transform. Reference numeral 811 denotes a switch. Reference numeral 812 denotes an entropy coding section, and reference numeral 813 denotes a code output section. Moreover, reference numeral 814 denotes a transform process switching section, and reference numeral 815 denotes a switch. In FIG. 8, the horizontal one-dimensional discrete wavelet transform sections 802, 805, and 808 are distinguished from the vertical one-dimensional discrete wavelet transform sections 804, 807, and 810 by adding (H) or (L), respectively. Each of the buffers 803 and 806 preferably has a storage capacity large enough to store coefficients for $(X_m/2) \times 6$ lines, and the buffer 809 preferably has a storage capacity large enough to store coefficients for $(X_m/4) \times 6$ lines.

Initially, all the pixel data indicating an image to be coded is input from the image input section 801 in a raster scan order. The image input section 801 may be, e.g., a scanner, a digital camera, a CCD, an interface of a network line, etc.

In the transform process switching section 814, when the number of pixels X of the image to be coded in the horizontal direction, input from the image input section 801, is equal to or greater than $X_m/2$, a control signal is sent online 802a to the switch 815 so that the switch 815 connects section 802 to the terminal "e". Otherwise, a control signal is sent online 802a to the switch 815 so that the switch 815 connects section 802 to the terminal "f".

Also, the image data representing the image to be coded is passed by section 814 to the one-dimensional discrete wavelet transform section 802.

The one-dimensional discrete wavelet transform section 802 performs a horizontal discrete wavelet transform on one line of the image data, passed from the transform process switching section 814, in order to generate coefficients of the low-frequency sub-band L and the high-frequency sub-band H. The transform process performed in section 814 is the same as that performed by the one-dimensional discrete wavelet transform section 102 in the first embodiment, and thus a further description thereof will not now be made.

The generated coefficients of the low-frequency sub-band L are then stored in buffer 803, and the generated coefficients of the high-frequency sub-band H are passed to the entropy coding section via the switch 811 when the switch 815 connects section 802 to the terminal "e", or are stored in the buffer 803, when the switch 815 connects section 802 to the terminal "f". When the switch 815 connects section 802 to the terminal "f", as shown in FIG. 6, the coefficients are stored in the buffer 803, with the low-frequency components being arranged in a first part and the high-frequency components being arranged in a second part, in units of one line each. The operations performed by the one-dimensional discrete wavelet transform section 804, the sections 811, 812, and code output section 813, are the same as the operations performed by the one-dimensional discrete wavelet transform section 104, the sections 111, 112, and code output section 113, of the first embodiment, and accordingly, further descriptions thereof will not now be made.

Figure 10:
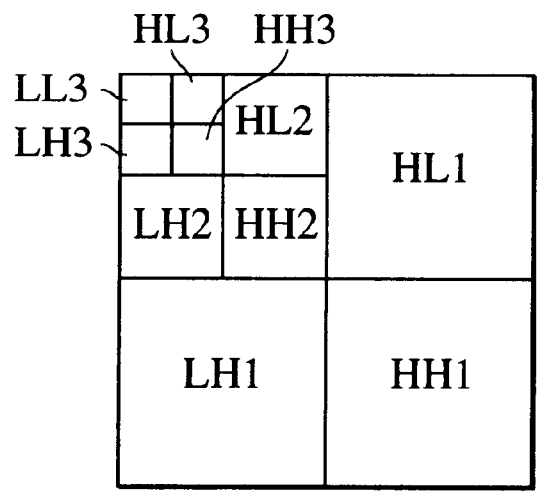
FIG. 10 shows an example of a typical sub-band division by a two-dimensional discrete wavelet transform.
Figure 11:
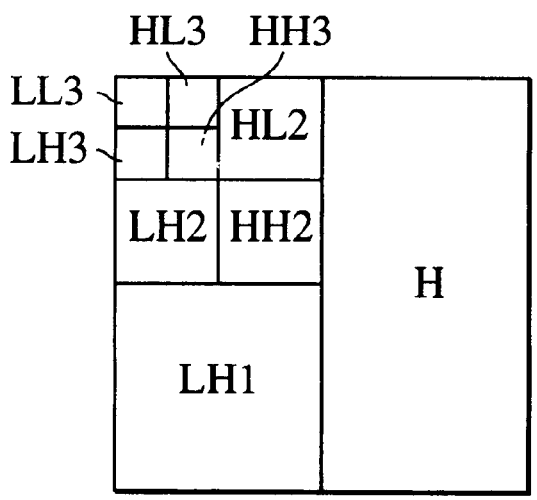
FIG. 11 shows a state of a special sub-band division according to the first embodiment of the present invention.
Figure 12D:
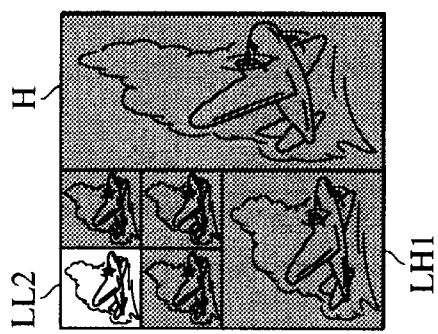
FIGS. 12A, 12B, 12C, and 12D show a process of a sub-band division according to the first embodiment of the present invention.
Figure 12C:
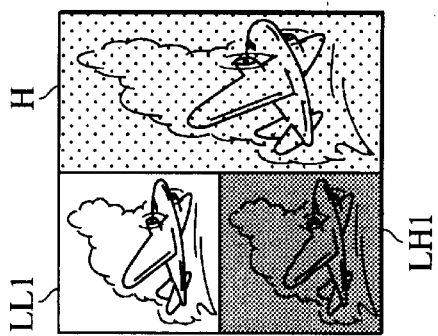
Figure 12B:
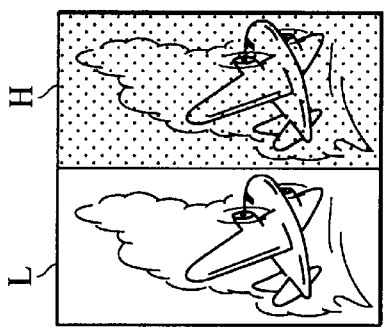
Figure 12A:
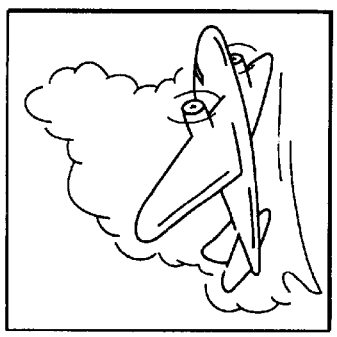

As a result of the above, a wavelet transform (sub-band division) process such as that shown in FIG. 11 is performed on an image whose number of pixels in the horizontal direction is equal to or greater than $X_m/2$, or otherwise, a wavelet transform process such as that shown in FIG. 10 is performed thereon. Thus, an efficient wavelet transform process which is appropriate for the size of the input image to be coded and the amount of buffer storage capacity within the apparatus can be performed.

Third Embodiment

A third embodiment of the present invention will now be described with reference to FIG. 13.

Figure 13:
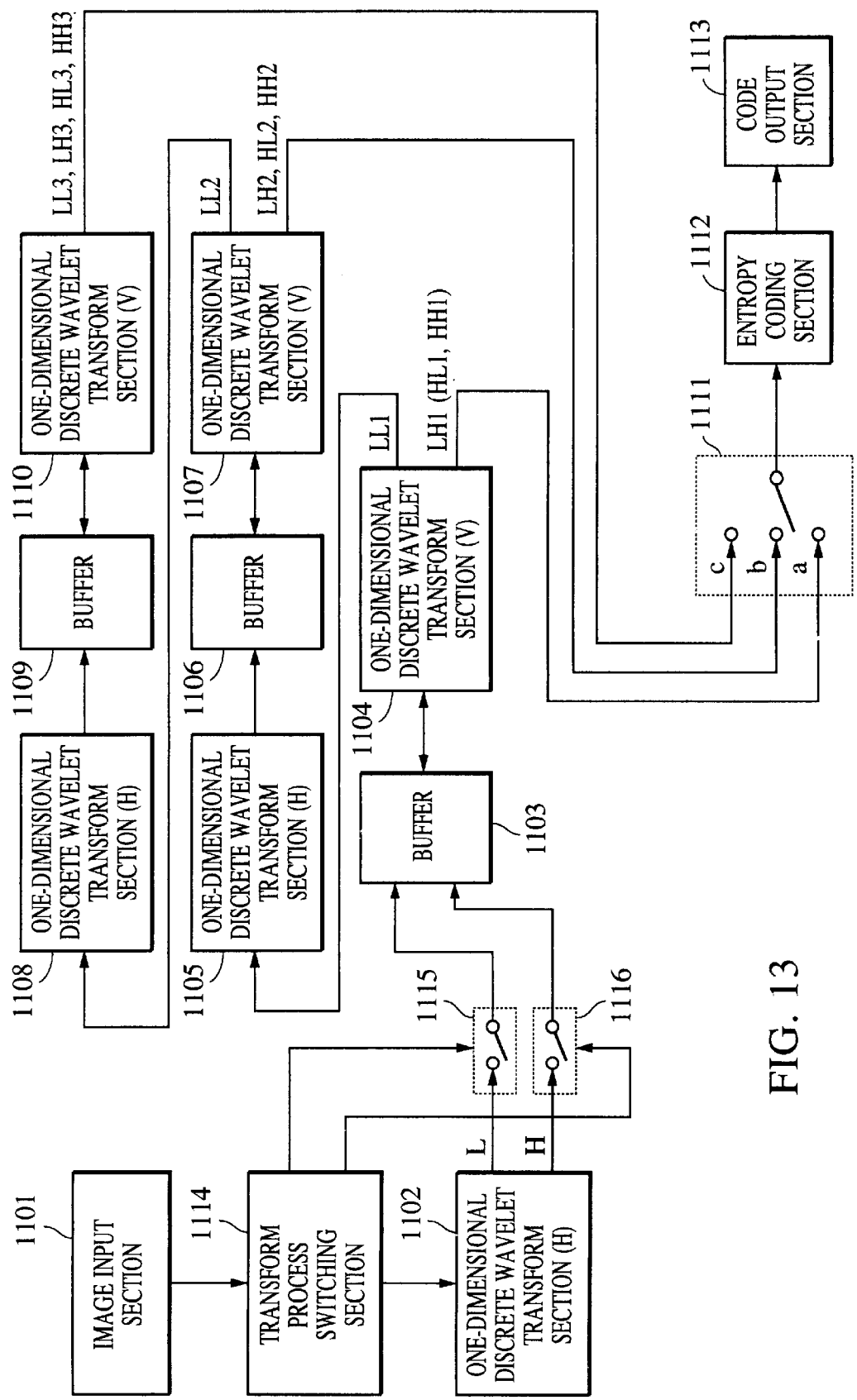
FIG. 13 is a block diagram of an apparatus according to a third embodiment of the present invention.

FIG. 13 shows a block diagram of an image processing apparatus according to the third embodiment of the present invention. Referring to FIG. 13, reference numeral 1101 denotes an image input section, reference numerals 1102, 1105, and 1108 denote discrete wavelet transform sections for performing a horizontal discrete wavelet transform, and reference numerals 1103, 1106, and 1109 denote buffers for implementing FIFO (first-in first-out). Reference numerals 1104, 1107, and 1110 denote discrete wavelet transform sections for performing a vertical discrete wavelet transform, reference numeral 1111 denotes a switch, and reference numeral 1112 denotes an entropy coding section. Also, reference numeral 1113 denotes a coding output section, reference numeral 1114 denotes a transform process switching section, and reference numerals 1115 and 1116 denote switches.

In FIG. 13, (H) and (L) are added to denote the horizontal one-dimensional discrete wavelet transform sections 1102, 1105, and 1108, and the vertical one-dimensional discrete wavelet transform sections 0004, 1107, and 1110, respectively, to distinguish which transform is performed in each section.

The description of this embodiment assumes that monochrome image data is to be coded, and that one pixel is eight bits in length. However, the present invention is not limited to this example, and can be applied to a case in which one pixel is represented by a number of bits other than eight bits, such as 4, 10, or 12 bits, and to a case in which a color multi-level image in which one pixel is formed by a plurality of other bit components is to be coded. Also, the present invention can be applied to a case in which multi-level information indicating the state of each pixel in an image area is to be coded, such as a case in which the color of each pixel is represented by an index value which is a constituent of a color table, and this value is to be coded. Also, the size (size of the document) of image data to be coded in this embodiment is assumed to be non-fixed, and the number of pixels of this document in the horizontal direction is assumed to be $H_{max}$ or less. Hereinafter, the number of pixels of the target image to be coded in the horizontal direction is denoted as X, and the number of pixels thereof in the vertical direction is denoted as Y. For simplicity of description, in this embodiment, it is assumed that both X and Y are multiples of 8.

An aspect of the image processing apparatus of this embodiment involves performing a coding process in one pass and a coding process in two passes by switching according to the number of pixels X of the image to be coded in the horizontal direction. Here, "one pass" refers to a series of processes starting from a process in which the first one-dimensional discrete wavelet transform is performed on the original image (document), followed by the performance of subsequent one-dimensional discrete wavelet transforms. In other words, "one pass", as used hehrein, refers to the entire image that is to be coded (image for the object of wavelet transform) being input once.

The operation of each section in this embodiment will now be described in detail. It is assumed that the switch 1111 is connecting the entropy coding section 112 to the terminal "a" when the coding process starts.

Initially, image data indicating an image (X*Y) to be coded is input in a raster scan order from the image input section 1101. This image input section 1101 is, for example, a storage device storing image data, such as a hard disk, a magneto-optical disk, or a memory, an image-capturing apparatus, such as a scanner, or an interface of a network line, etc.

Next, the transform process switching section 1114 checks the number of pixels X of the image data in the horizontal direction, input from the image input section 1101, and controls the switches 1115 and 1116 so that a coding process in one pass is performed when the number of pixels is equal to or smaller than a predetermined number $H_{max}/2$ and a coding process in two passes is performed when the number of pixels is greater than the predetermined number $H_{max}/2$. That is, in the case of coding in one pass, a control signal is output to the switches 1115 and 1116 for causing the switches 1115 and 1116 to each be placed in a closed state. Also, in the case of coding in two passes, only the switch 1115 is placed in a closed state during coding in the first pass, and a coding process of the image data (X*Y) is performed. During coding in the second pass, only the switch 1116 is placed in a closed state, and a coding process is performed once more beginning from the start of the image data (X*Y).

In the one-dimensional discrete wavelet transform section (H) 1102, a horizontal wavelet transform is performed in sequence on the image data input via the transform process switching section 1114 so that the image data is divided into a low-frequency sub-band (L) and a high-frequency sub-band (H). In this embodiment, a discrete wavelet transform is performed based on the following equations. Also, in the horizontal one-dimensional discrete wavelet transform sections (H) 1105 and 1108 (to be described later) and the vertical one-dimensional discrete wavelet transform sections (V) 1104, 1107, and 1110 (to be described later), a wavelet transform is performed in a similar manner based on the following equations:

$$r_n=\text{floor}\,[(x_{2n}+x_{2n+1})/2] \tag{1}$$

$$d_n=(x_{2n+2}-x_{2n+3})+\text{floor}\,[(-r_n+r_{n+2}+2)/4] \tag{2}$$

here $r_n$ is the coefficient of the n-th low-frequency sub-and produced after the one-dimensional discrete wavelet transform is performed, $d_n$ is the coefficient of the n-th high-frequency sub-band produced after the one-dimensional discrete wavelet transform is performed, $x_n$ is the n-th coefficient in the one-dimensional image data to be transformed, and floor $[x_n]$ indicates the maximum integer which does not exceed $x_n$.

A wavelet transform is also performed in a similar manner in the horizontal one-dimensional discrete wavelet transform sections 1105 and 1108 (to be described later) and the vertical one-dimensional discrete wavelet transform sections 1104, 1107, and 1110 (to be described later), using the above-described equations. However, in this case, it is assumed that $x_n$ to be transformed is a transform coefficient obtained after at least one horizontal wavelet transform is performed, and is an n-th coefficient among the one-dimensional transform coefficients to be transformed in sequence. Furthermore, in the case of the vertical direction, the scanning direction of data to be transformed differs.

In each of the above-described equations, one coefficient of the low-frequency sub-band or one coefficient of the high-frequency sub-band is generated for every two pieces of data ($x_{2n}$ and $x_{2n+1}$, or $x_{2n+2}$ and $x_{2n+3}$) to be transformed. Therefore, the number of coefficients of the low-frequency sub-band and high-frequency sub-band, obtained after the one-dimensional discrete wavelet transform is performed, becomes equal to the number of images that are to be transformed or the number of transform coefficients, as can also be understood from FIGS. 9A to 9D.

Next, the coefficients of the low-frequency sub-band or the high-frequency sub-band, obtained in the first one-dimensional wavelet transform section 1102, are stored in the buffer 1103 via the switch 1115 or 1116. Which coefficients are stored in the buffer 1103 depends on the size of the image to be coded and on the coding of the image in the first pass or in the second pass. For example, assume that the image to be coded has a size larger than a predetermined size. In the case of coding for the first pass (when the document is read the first time), the coefficients of the low-frequency sub-band are stored in the buffer 1103 via the switch 1115. In the case of coding for the second pass, the coefficients of the high-frequency sub-band are stored in the buffer 1103 via the switch 1116. When the switches 1115 and 1116 are both in an open state, each coefficient is discarded via these switches.

Figure 14:
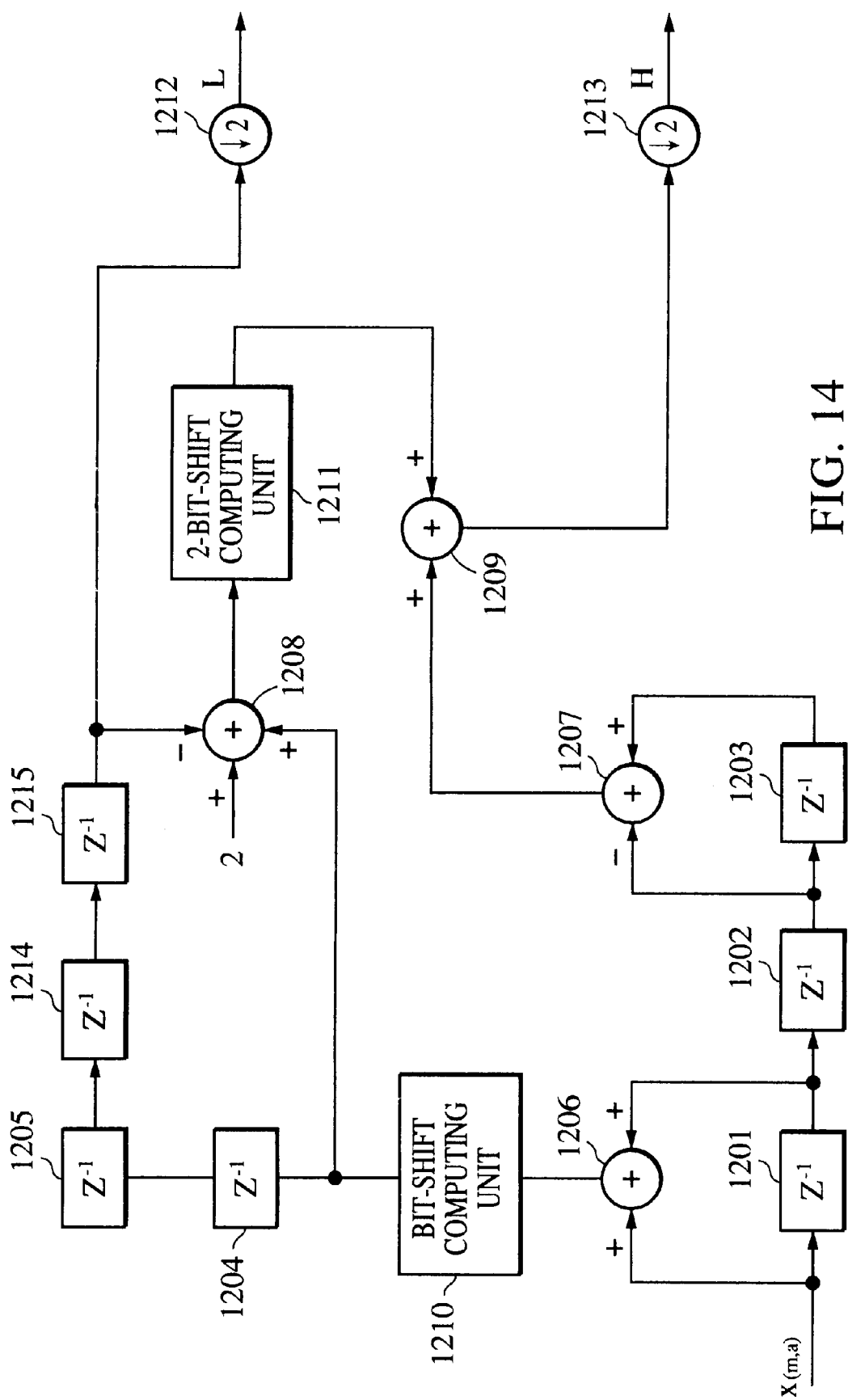
FIG. 14 shows the internal construction of a horizontal one-dimensional discrete wavelet transform section 1102.

FIG. 14 shows the internal construction of the one-dimensional discrete wavelet transform section 1102 for performing a one-dimensional discrete wavelet transform. In FIG. 14, reference numerals 1201, 1202, 1203, 1204, 1205, 1214, and 1215 denote pixel delay circuits. Reference numerals 1206, 1207, 1208, and 1209 denote adders. Reference numeral 1210 denotes a bit-shift computing unit for shifting bit information to the right by one bit. Reference numeral 1211 denotes a bit-shift computing unit for shifting bit information to the right by two bits, and reference numerals 1212 and 1213 denote 2:1 down sampling circuits. For simplicity of description, a detailed description of other processing that may be performed for the left and right ends of an image is omitted.

With respect to pixel values $x_{(m,a)}$ ("m" is one of the range 0 to X−1 of the number of pixels in the horizontal direction, and "a" is a constant within the range 0 to Y−1 of the number of pixels in the vertical direction) for one line of the image data which is input in the raster scan order to the one-dimensional wavelet transform section 1102, four pixel values $x_{(m+2,a)}$, $x_{(m+3,a)}$, $x_{(m+4,a)}$, and $x_{(m+5,a)}$ are extracted by the pixel delay circuits 1201 to 1203, a result of the expression $x_{(m+4,a)}+x_{(m+5,a)}$ is determined by the adder 1206, and a result of the expression $x_{(m+2,a)}-x_{(m+3,a)}$ is determined by the adder 1207. In the bit-shift computing unit 210, the computation result of the adder 1206 is shifted to the right by one bit (corresponding to a process of multiplying by ½ and then discarding the decimals). he image data is delayed by an amount of four pixels by the pixel delay circuits 1204, 1205, 1214, and 1215. The adder 1208 determines a value by subtracting the output of the pixel delay circuit 1215 from the computation result of the bit-shift computing unit 1210, and by adding 2 to the determined value. The resulting value is then shifted to the right by two bits (corresponding to a process of multiplying by ¼ and then discarding the decimals) by the 2-bit-shift computing unit 1211. The adder 1209 adds the computation result of the adder 1207 to the computation result of the 2-bit-shift computing unit 1211. The down sampling circuits 1212 and 1213 reduce the outputs of the pixel delay circuit 1215 and the adder 1209, respectively, by one half, and output a coefficient $r_{(m,a)}$ of the low-frequency sub-band and a coefficient $d_{(m,a)}$ of the high-frequency sub-band, respectively.

Figure 16:
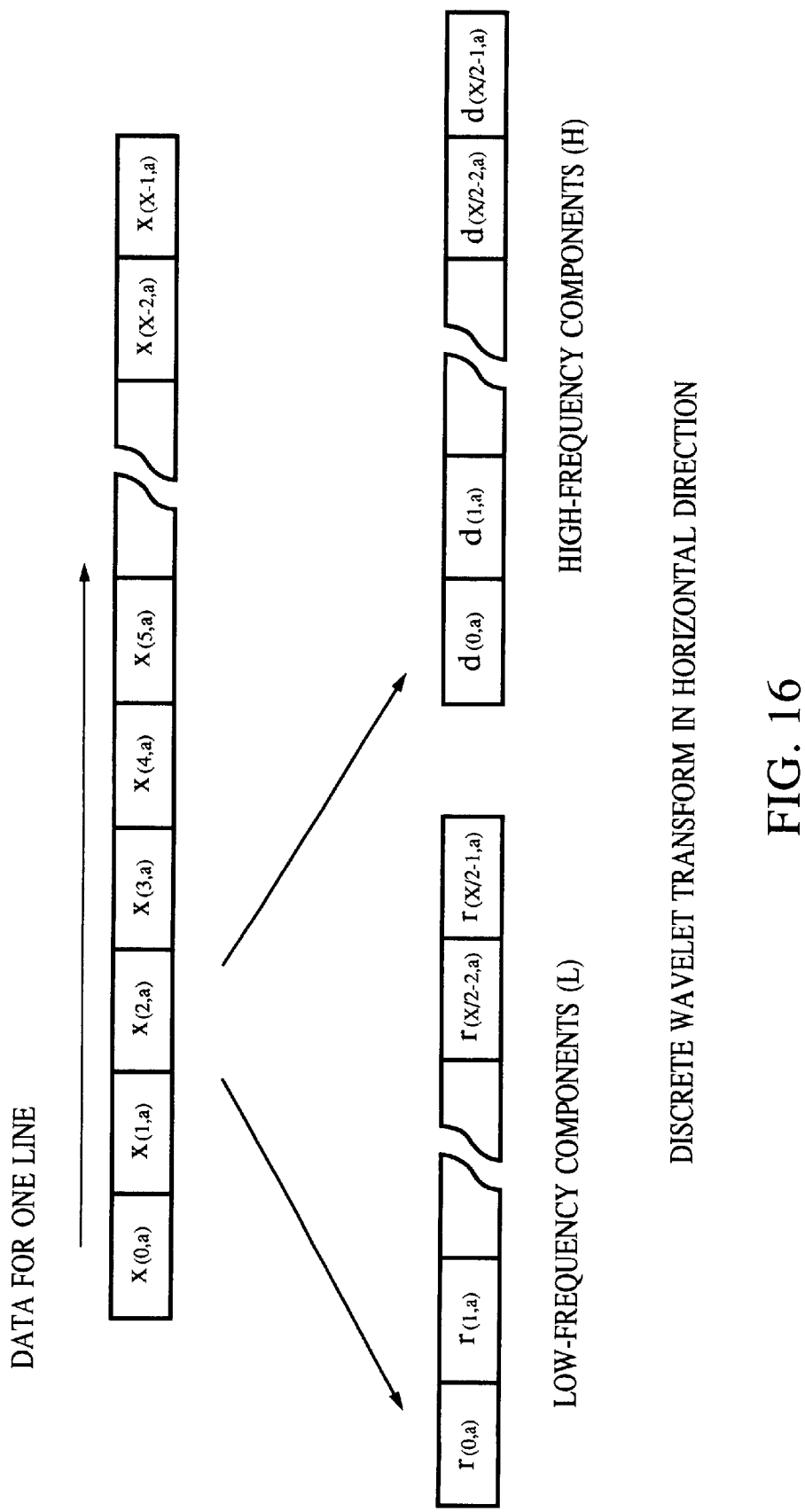
FIG. 16 shows a state of a horizontal one-dimensional discrete wavelet transform.

FIG. 16 represents an example of a case in which data $x_{(0,a)}$ to $x_{(X-1,a)}$ for one line in the horizontal direction is subjected to a one-dimensional discrete wavelet transform with respect to the horizontal direction, in the above-described manner, and coefficients $r_{(0,a)}$ to $r_{(X/2)-1,a)}$ of the low-frequency sub-band for one line and coefficients $d_{(0,a)}$ to $d_{(X/2)-1,a)}$ of the high-frequency sub-band for one line are generated.

The coefficients of the low-frequency sub-band and the coefficients of the high-frequency sub-band, which are input through the switches 1115 and 1116, are stored in the buffer 1103.

In this embodiment, when the number of pixels of the image data (document) to be coded is equal to or smaller than $H_{max}/2$ in the horizontal direction, both the low-frequency sub-band and the high-frequency sub-band can sufficiently be stored in the buffer 1103 at the same time, causing both the switches 1115 and 1116 to be placed in a closed state. In this case, the coding process is performed in only one pass (only one scan of the document).

On the other hand, when the number of pixels of the image data (document) to be coded in the horizontal direction is greater than $H_{max}/2$, both the low-frequency sub-band and the high-frequency sub-band cannot be stored in the buffer 1103 at the same time, and therefore, the above-described coding by two passes (two scans of the document) is performed. For this case, in the first pass, only the coefficients of the low-frequency sub-band are stored in the buffer 1103, and in the second pass, only the coefficients of the high-frequency sub-band are stored in the buffer 1103, in the above-described manner.

When the number of pixels in the horizontal direction is greater than $H_{max}/2$, only one of the low-frequency sub-band and the high-frequency sub-band is stored in the buffer 1103, and therefore, the maximum amount of data in the horizontal direction to be stored in this buffer 1103 is $H_{max}/2$. For this reason, the buffer 1103 has a storage capacity of N times $H_{max}/2$, where N corresponds to the number of lines required when a vertical discrete wavelet transform is performed. In the present embodiment, N=6, which corresponds to the number of longest taps of a filter used in this transform.

When coefficients $r_{(0,m)}$ to $r_{((X/2)-1,m+5)}$, or $d_{(0,m)}$ to $d_{((X/2)-1,m+5)}$, or both for six lines, are stored in buffer 1103, (wherein the m-th (m is an even number) line of the low-frequency sub-band L, or the high-frequency sub-band H, or of both sub-bands L and H (generated by the one-dimensional wavelet transform section 1102) is a first one of the lines), then the one-dimensional discrete wavelet transform section 1104 performs a vertical discrete wavelet transform on each coefficient output by the buffer 1103, and generates (for the low-frequency sub-band L) coefficients for one line of LL1 corresponding to the low-frequency sub-band, and coefficients for one line of LH1 corresponding to the high-frequency sub-band (with respect to the vertical direction of the low-frequency sub-band L). The one-dimensional discrete wavelet transform section 1104 generates, for the high-frequency sub-band H, HL1 corresponding to the low-frequency sub-band in the vertical direction of the high-frequency sub-band and HH1 corresponding to the high-frequency sub-band in the vertical direction. The LL1 components which are generated are then sent to the one-dimensional discrete wavelet transform section 1105, and the LH1, HL1, and HH1 components which are generated are passed to the entropy coding section 1112 via the switch 1111. The switch 1111 is controlled so that it connects section 1112 to the terminal "a" in synchronization with the generation of the LH1, HL1, and HH1 components.

Figure 15:
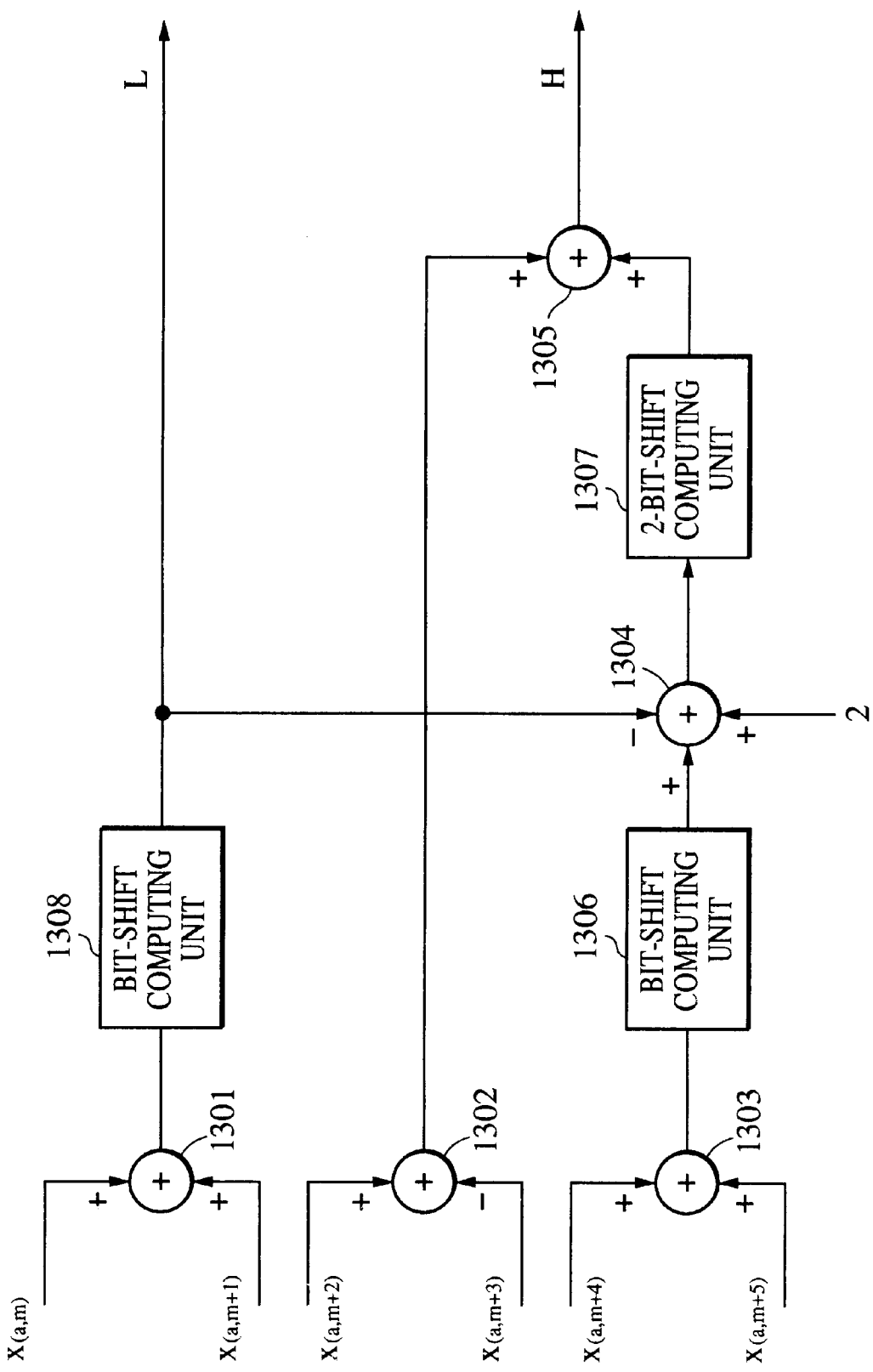
FIG. 15 shows the internal construction of a vertical one-dimensional discrete wavelet transform section 1104.

FIG. 15 shows the internal construction of the one-dimensional discrete wavelet transform section 1104. In FIG. 15, reference numerals 1301, 1302, 1303, 1304, and 1305 denote adders. Reference numerals 1306 and 1308 denote bit-shift computing units for shifting bit information to the right by one bit. Reference numeral 1307 denotes a bit-shift computing unit for shifting bit information to the right by two bits. The one-dimensional discrete wavelet transform section 1104 performs a vertical one-dimensional discrete wavelet transform either to the coefficients of the low-frequency sub-band for six lines or to the coefficients of the high-frequency sub-band for six lines, output by the buffer 1103. Since the processing is the same for both the low-frequency sub-band and the high-frequency sub-band, a description is given here in the context of an example for processing the coefficients of the low-frequency sub-band. Initially, in this example, six coefficients $x_{(a,m)}$, $x_{(a,m+1)}$, $x_{(a,m+2)}$, $x_{(a,m+3)}$, $x_{(a,m+4)}$, and $x_{(a,m+5)}$, which are consecutive in he vertical direction, are input into the one-dimensional discrete wavelet transform section 1104 from the buffer 1103 (and thus, the above coefficient $x_{(a,m)}$ is data to which a one-dimensional wavelet transform has already been performed). In the adders 1301, 1302, and 1303 of FIG. 15, the expressions $x_{(a,m)}+x_{(a,m+1)}$, $x_{(a,m+2)}-x_{(a,m+3)}$, and $x_{(a,m+4)}+x_{(a,m+5)}$) are determined, respectively. The bit-shift computing units 1308 and 1309 shift the computation results of the adders 1301 and 1303 to the right by one bit, respectively. In the adder 1304, the difference between these computation results is determined, and 2 is added thereto. Then, in the bit-shift computing unit 1307, the computation result of the adder 1304 is shifted to the right by two bits.

The adder 1305 then adds the computation result output from the adder 1302 to the computation result output from the bit-shift computing unit 1307, and outputs the result as a coefficient of the high-frequency sub-band. Also, the computation result from the bit-shift computing unit 1308 is directly output as a coefficient of the low-frequency sub-band.

Figure 17:
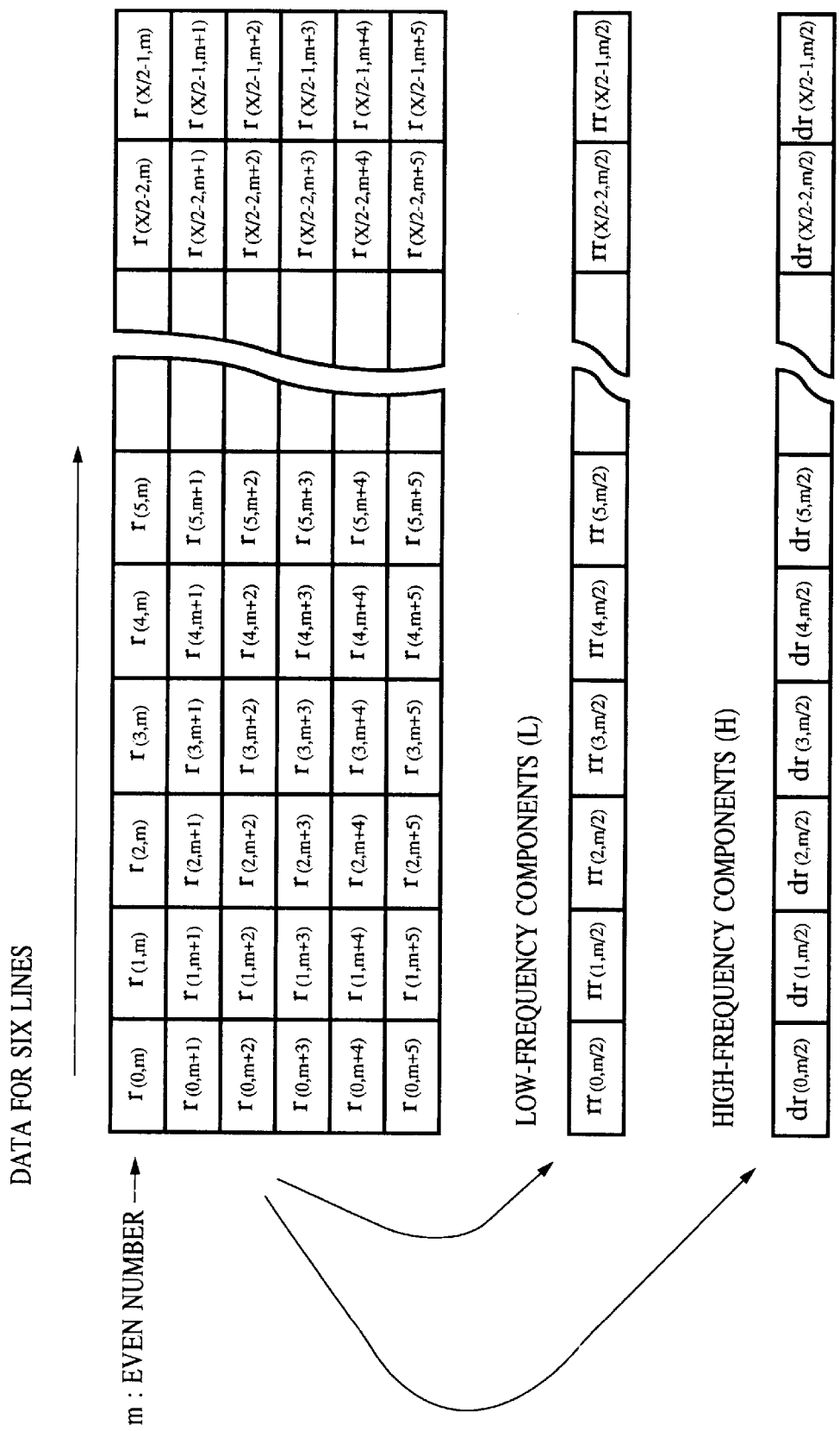
FIG. 17 shows a state of a vertical one-dimensional discrete wavelet transform.

FIG. 17 represents an example of a case in which the one-dimensional discrete wavelet transform section 1104 performs a vertical one-dimensional discrete wavelet transform to coefficients $r_{(0,m)}$ to $r_{((X/2)-1,m+5)}$ of the low-frequency sub-band in the horizontal direction, to generate coefficients $rr_{(0,m/2)}$ to $rr_{((X/2)-1,m/2)}$ of the low-frequency sub-band (for one line) and coefficients $dr_{(0,m/2)}$ to $dr_{((X/2)-1,m/2)}$ of the high-frequency sub-band (for one line).

Referring again to FIG. 13, when the LL1 sub-band is formed by the one-dimensional discrete wavelet transform section 1104, the coefficients of this sub-band are further divided into eight sub-bands by the one-dimensional discrete wavelet transform sections 1105, 1107, 1108, and 1110 (to be described later). When the switch 1115 is in a non-closed state and only the switch 1116 is in a closed state, only the HL1 and HH1 sub-bands are generated and output from the one-dimensional discrete wavelet transform section 1104. In this case, processing performed by the one-dimensional discrete wavelet transform sections 1105, 1107, 1108, and 1110 (to be described later) is not performed.

The one-dimensional discrete wavelet transform section 1105 performs a horizontal one-dimensional discrete wavelet transform to the coefficients of the LL1 sub-band generated by the one-dimensional discrete wavelet transform section 1104. Since this discrete wavelet transform is the same as the above-described operation of the one-dimensional discrete wavelet transform section 1102, and differs only in size, a detailed description thereof will not be made herein. Also, both of the coefficients which constitute the low-frequency sub-band and the coefficients which constitute the high-frequency sub-band, obtained by the one-dimensional discrete wavelet transform section 1105, are stored in the buffer 1106 so that vertical discrete wavelet transform can be performed at a subsequent stage.

Figure 18:
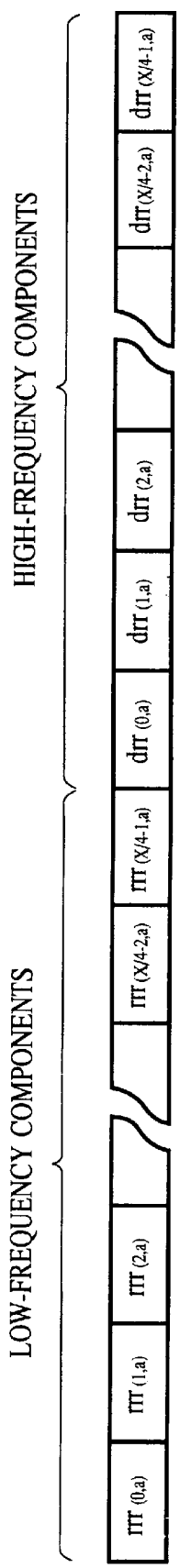
FIG. 18 shows a state in which coefficients are stored in a buffer 1106.

The storage of data in the buffer 1106 is performed in such a manner that, as shown in FIG. 18, the data is arranged for each line in the sequence of the low-frequency components $rrr_{(0,a)}$ to $rrr_{((X/4)-1,a)}$ and the high-frequency components $drr_{(0,a)}$ to $drr_{((X/4)-1,a)}$. Here, "a" is an arbitrary number from 0 to (Y/2)−1.

As is clear from the foregoing description, the buffer 1106 needs only one half of the storage capacity of the buffer 1103.

After buffer 106, the one-dimensional discrete wavelet transform section 1107 performs a process which is the same as the process of the one-dimensional discrete wavelet transform section 1104.

For example, after coefficients of the low-frequency components and the high-frequency components for six lines (which are obtained by subjecting the low-frequency sub-band LL1 to a one-dimensional discrete wavelet transform in the horizontal direction, with the m-th (m is an even number) line being a first line) are stored in the buffer 1106 and are later output from that buffer 1106, a vertical discrete wavelet transform is performed in section 1107 on each output coefficient.

As a result, four frequency sub-bands LL2, LH2, HL2, and HH2 are obtained. The obtained low-frequency sub-band LL2 is sent to the one-dimensional discrete wavelet transform section 1108 so that horizontal and vertical discrete wavelet transforms are further performed thereon. In contrast, the other frequency sub-bands LH2, HL2, and HH2 10 are sent to the entropy coding section 1112 via the switch 1111. The switch 1111 is controlled to connect the terminal "b" to section 1112 in synchronization with the generation of the LH2, HL2, and HH2.

When the coefficients for six lines stored in the buffer 1106 are stored with an odd-numbered line being at the start, a transform process is not subsequently performed in the one-dimensional discrete wavelet transform section 1107. Therefore, the number of the transform coefficients of the original data to be transformed becomes equal to the number of transform coefficients after wavelet transform.

The low-frequency sub-band LL2 generated by the one-dimensional discrete wavelet transform section 1107 is provided to the one-dimensional discrete wavelet transform section 1108, to the buffer 1109, and then to the one-dimensional discrete wavelet transform section 1110, which perform processes similar to those performed by the one-dimensional discrete wavelet transform section 1105, the buffer 1106, and the one-dimensional discrete wavelet transform section 1107, respectively, thereby causing the data to be further divided into four frequency bands LL3, LH3, HL3, and HH3. In this embodiment, since a case is described in which the lowest frequency components for both the horizontal and vertical directions are obtained by three wavelet transforms in the horizontal and vertical directions, the four generated sub-bands LL3, LH3, HL3, and HH3 are output to the entropy coding section 1112 at a subsequent stage via the terminal "c" of the switch 1111. However, the present invention is not limited to this example, and wavelet transforms in the horizontal and vertical directions may be performed more or less than three times.

Since the amount of data in the horizontal direction of the coefficients processed by the components from one-dimensional discrete wavelet transform section 1108 to the one-dimensional discrete wavelet transform section 1110 is one half of the amount of data in the horizontal direction processed by the components from the one-dimensional discrete wavelet transform section 1105 to the one-dimensional discrete wavelet transform section 1107, the buffer 1109 needs only half of the storage capacity of the buffer 1106.

Next, the entropy coding section 1112 codes coefficients for one line of each sub-band, input via the switch 1111, by using a Golomb code. The Golomb code is a coding scheme for non-negative integer values which is capable of generating codes corresponding to several types of probability distributions by appropriately determining a coding parameter (denoted as a k parameter). In this embodiment, the k parameter is selected such that the code length becomes shortest for each line of coefficients of each sub-band, and after a coefficient (denoted as C) is transformed into a non-negative integer value (denoted as V) by the following equation (4). This value V is Golomb-coded based on the selected k parameter.

$$V = \begin{cases} 2 \times C & (\text{when } C \geq 0) \\ -2 \times C - 1 & (\text{when } C < 0) \end{cases} \quad (4)$$

The selected k parameter is transmitted by being contained in the code sequence. The procedure for Golomb-coding the non-negative integer value V to be coded, using the coding parameter k, is as follows.

Initially, V is shifted to the right by k bits and an integer value m is determined. The codes for V are formed of a combination of "1" following m "zeros" and the k low-order bits of V. FIG. 19 shows an example of a Golomb code when k=0, 1, 2, and 3.

The final coded data in this embodiment is passed to the code output section 1113. The code output section 1113 may include, for example, a storage device, such as a hard disk or a memory, or an interface of a network line, etc. The coded data is stored in that section 1113, or is transmitted on a transmission line (not shown).

When coding in two passes is to be performed, that is, when the number of pixels of the image data to be coded in the horizontal direction is greater than $H_{max}/2$, the switch 1115 is switched so as to be placed in an opened state, and the switch 1116 is placed in a closed state so that image data is read from the image input section 1101 again, beginning from the start thereof, and then the above-described processing is performed.

As a result of the above processing, image coding using a wavelet transform can be performed efficiently using a smaller amount of memory than has been required in the past. The switch 1111 in this embodiment is switched according to a line-by-line basis. In order to obtain such switching, data storage during processing and the operation of the whole apparatus are controlled by a control apparatus (not shown).

Also, in order that accurate decoding is performed on the decoding side, if necessary, image size information, formation for the color components, etc., are added as additional information for the final coded data.

Fourth Embodiment

A fourth embodiment of the present invention will now be described with reference to the drawings.

In this embodiment, a description is given assuming what monochrome image data is to be coded, wherein one pixel is assumed to be eight bits in length.

However, the present invention is not limited to this example, and can also be applied to color multi-level image coding. Also, the present invention can be applied to a case in which multi-level information indicating the state of each pixel in an image area is to be coded, such as, for example, a case in which the color of each pixel is represented by an index value of a color table, and wherein this value is to be coded. Although in the third embodiment, the maximum amount of image data to be coded is assumed to be $H_{max}$, in the fourth embodiment, the maximum amount of image data to be coded is assumed to be $H_{max} \times 2$, which is twice as large. In a manner similar to the third embodiment, the number of pixels of the target image to be coded in the horizontal direction is denoted as X, and the number of pixels thereof in the vertical direction is denoted as Y. For simplicity of description, in this embodiment, it is assumed that both X and Y are multiples of 8.

Figure 20:
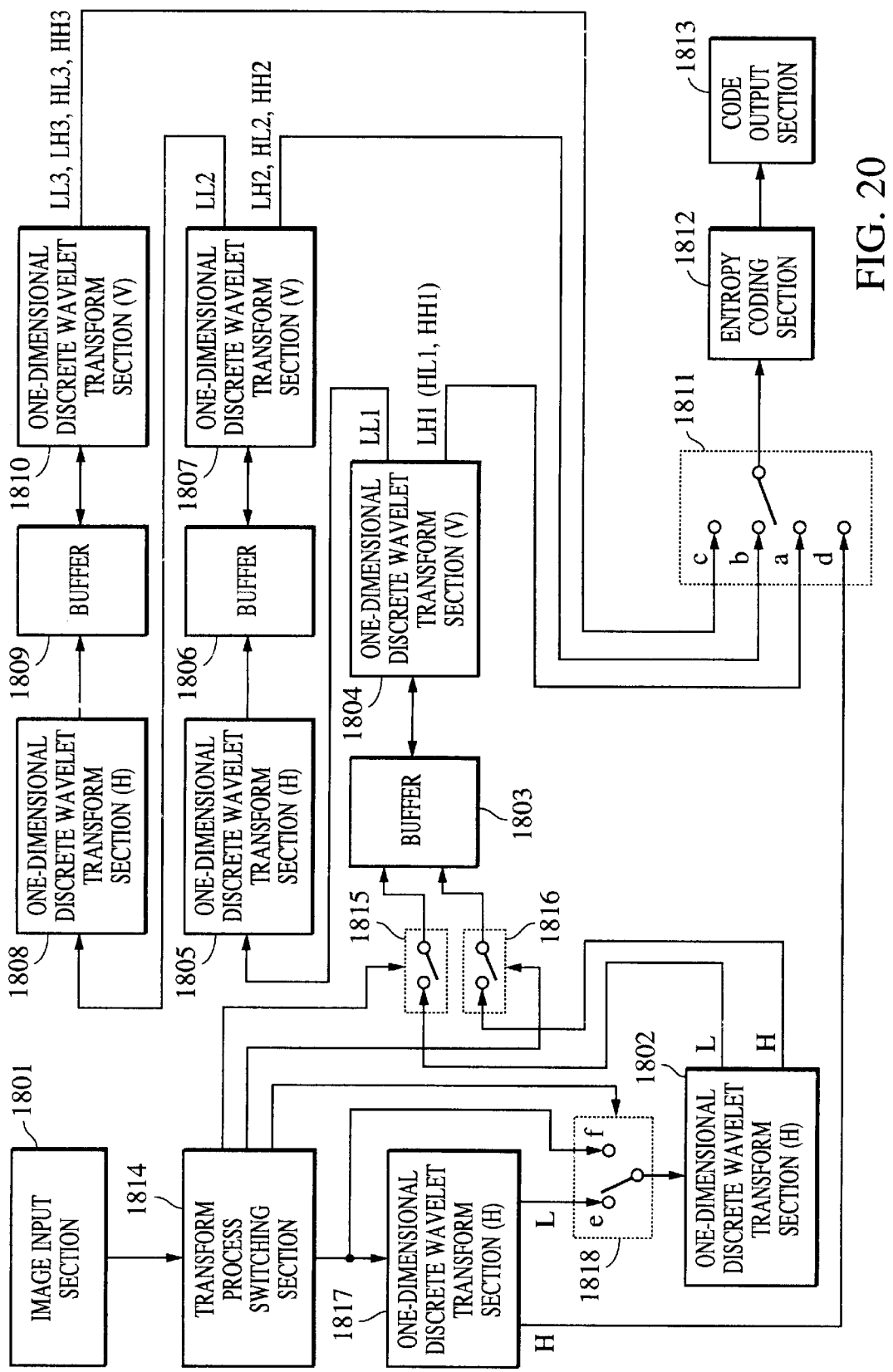
FIG. 20 is a block diagram of an apparatus according to a fourth embodiment of the present invention.

FIG. 20 shows a block diagram of an image processing apparatus according to the fourth embodiment of the present invention. Referring to FIG. 20, reference numeral 1801 denotes an image input section. Reference numerals 1802, 1805, 1808, and 1817 denote one-dimensional discrete wavelet transform sections for performing a horizontal wavelet transform. Reference numerals 1803, 1806, and 1809 denote buffers for FIFO (first-in first-out). Reference numerals 1804, 1807, and 1810 denote discrete wavelet transform sections for performing a vertical discrete wavelet transform, and reference numeral 1811 denotes a switch. Reference numeral 1812 denotes an entropy coding section 1812. Also, reference numeral 1813 denotes a coding output section, reference numeral 1814 denotes a transform process switching section, and reference numerals 1815, 1816, and 1818 denote switches. In the representation in the figures, the horizontal one-dimensional discrete wavelet transform sections are distinguished from the vertical one-dimensional discrete wavelet transform sections by (H) or (L), respectively.

In the present embodiment, a one-dimensional discrete wavelet transform section is further added to the image processing apparatus of the third embodiment. According to the present embodiment, when image data whose number of pixels in the horizontal direction is greater than $H_{max}$ and equal to or smaller than $H_{max} \times 2$ is to be coded, frequency division is performed using the newly added one-dimensional discrete wavelet transform, and a vertical discrete wavelet transform is not performed on generated coefficients of the high-frequency sub-band, thereby reducing the amount of memory capacity necessary for performing the discrete wavelet transform.

Initially, all of the pixel data indicating image data to be coded is input in a raster scan order from the image input section 1801. This image input section 1801 is, for example, a storage device storing image data, such as a hard disk, a magneto-optical disk, or a memory, an image-capturing device, such as a scanner, an interface of a network line, etc.

The transform process switching section 1814 checks the number of pixels of the image data in the horizontal direction input from the image input section 1801, and controls the switches 1815 and 1816 so that a coding process in one pass is performed when the number of pixels is equal to or smaller than a predetermined number $H_{max}/2$, and a coding process in two passes is performed when the number of pixels is greater than the predetermined number $H_{max}/2$. That is, in the case of coding in one pass, a control signal is output for causing both the switches 1815 and 1816 to be placed in a closed state. Also, in the case of coding in two passes, initially, only the switch 1815 is placed in a closed state, and a process for coding the image data is performed. Then, only the switch 1816 is placed in a closed state, and a coding process for coding the image data is performed once more beginning from the start of the image data. This operation is the same as that of the transform process switching section 1114 in the third embodiment. In the present embodiment, however, the number of pixels of the input image data in the horizontal direction is further compared with the predetermined number $H_{max}$. When the number of pixels is greater than $H_{max}$, a control signal is output so that the output of the switch 1818 becomes connected to the input terminal "e", and, when the number of pixels is equal to or smaller than $H_{max}$, a control signal is output so that the output of the switch 1818 becomes connected to the input terminal "f".

The one-dimensional discrete wavelet transform section 1817 performs a horizontal discrete wavelet transform to one line of image data input via the transform process switching section 1814, thereby generating the coefficients of the low-frequency sub-band L and the coefficients of the high-frequency sub-band H. The coding process performed here is the same as that of the one-dimensional discrete wavelet transform section 1802 in the third embodiment, and accordingly, a further detailed description thereof will not now be made. Each generated coefficient of the high-frequency sub-band H is sent to the entropy coding section 1812 via the switch 1811. It is assumed that the output of the switch 1811 is connected to the terminal "d" in synchronization with the generation of the coefficient of the high-frequency sub-band H.

The one-dimensional discrete wavelet transform section 1802 performs a horizontal discrete wavelet transform on one line of data input via the switch 1818 in order to generate the coefficients of the low-frequency sub-band and the coefficients of the high-frequency sub-band. The data input to the one-dimensional discrete wavelet transform section 1802 is each pixel which is a constituent of the image data when the number of pixels of the image data to be coded in the horizontal direction is equal to or smaller than $H_{max}$, and the data is each coefficient of the low-frequency sub-band, generated by the one-dimensional discrete wavelet transform section 1817, when the number of pixels is greater than $H_{max}$. There are cases where the input data becomes a transform coefficient for a discrete wavelet transform for the processing provided by the components including from the one-dimensional discrete wavelet transform section 1802 to the one-dimensional discrete wavelet transform section 1810, and the switch 1811, the entropy coding section 1812, and the coding output section 1813. Since these components operate in a same manner as the components 1102 to 1113, respectively, of the third embodiment, a further detailed description thereof will not now be made. When the input data of the one-dimensional discrete wavelet transform section 1802 is the coefficient of the low-frequency sub-band, generated by the one-dimensional discrete wavelet transform section 1817, the discrete wavelet transform performed by this embodiment is a transform which is asymmetrical with respect to the horizontal and vertical directions, as shown in FIG. 11.

In this embodiment, a coding process in two passes is performed on an image whose number of pixels in the horizontal direction is equal to or greater than $H_{max}/2$, and further, the form of the discrete wavelet transform is changed as shown in FIG. 11 with respect to an image whose number of pixels in the horizontal direction is greater than $H_{max}$, thereby making it possible to perform an efficient coding process with a smaller amount of memory storage capacity.

Although this invention is described in the context of the low-frequency sub-band (L) obtained by the one-dimensional discrete wavelet transform section 1102 or 1802 in the first pass being stored in the buffer 1103 or 1803 at a subsequent stage, and in the context of the high-frequency sub-band (H) obtained by the one-dimensional discrete wavelet transform section 1102 or 1802 in the second pass being stored in the buffer 1103 or 1803, the present invention is not limited to this example. For example, also within the scope of this invention is an embodiment in which the low-frequency sub-band (L) obtained by the one-dimensional discrete wavelet transform section 1102 or 1802 in the N-th pass is stored in the buffer 1103 or 1803 at a subsequent stage, and in which the high-frequency sub-band (H) obtained by the one-dimensional discrete wavelet transform section 1102 or 1802 in the M-th (M≠N, or M>N or M<N) pass is stored in the buffer 1103 or 1803.

Also, although the one-dimensional discrete wavelet transform section in each of the above embodiments is described as being one processing block, the present invention is not limited to this example, and may comprise a plurality of computation sections. For example, although the invention is described in the context of the one-dimensional discrete wavelet transform section 1102 generating a low-frequency sub-band and a high-frequency sub-band, it also is within the scope of the present invention to generate those sub-bands in separate processing blocks.

Another Embodiment

The present invention is not limited to the above-described embodiments. For example, in each embodiment, the number of divisions of the sub-band of the low-frequency components may differ. Also, the types of filters used for performing the wavelet transform may be any suitable types of filters.

Although in each embodiment, a construction is described in which data for the number of longest filter taps is stored in a buffer and a vertical wavelet transform is performed, the wavelet transform may be combined with another technique, such as a lifting scheme, (see, e.g., W. Sweldens, "The lifting scheme: A construction of second generation wavelets", SIAM J. Math. Anal. Vol. 29, No. 2, pp. 511–546, March 1998), etc., which can be performed to reduce the amount of memory storage capacity required.

Also, the he method for coding each wavelet transform coefficient is not limited to those of each embodiment described above. For example, a coding process may be performed after each transform coefficient is quantized, and entropy coding, other than Golomb coding, such as arithmetic coding, may be used.

Although in the above-described embodiments, a case is described in which image data is sequentially input in the raster direction (horizontal direction) and is processed, when the input sequence is in the vertical direction, the same processing is performed, but for that image data in the vertical direction.

Although the above-described embodiments are described in the content of the low-frequency components being subjected to a wavelet transform repeatedly, the present invention is not limited to this example, and can be applied to a case in which the high-frequency components HH1, HH2, and HH3 are subjected to wavelet transform repeatedly in a manner similar to each embodiment described above. In this case, the low-frequency components L are input to the terminal "a" of the switch 111 in FIG. 1.

The present invention may be applied to a part of a system comprising a plurality of apparatuses (for example, a host computer, an interface apparatus, a printer, and so on), or may be applied to a part of an apparatus formed of a single unit (for example, a copying machine, a facsimile apparatus, a digital camera, and so on).

Also, the present invention is not limited to only the apparatus and method for realizing the above-described embodiments, and the following also is included within the scope of the present invention: program codes of software that realize the functions of the above-described embodiment are supplied to a computer (or a CPU or MPU) within an apparatus or a system, and the various devices are operated by the computer of that system or apparatus according to the program codes. In this case, the program codes themselves enable the functions of the above-described embodiment to be performed, and the program codes themselves and means for supplying the program codes to the computer, specifically, a storage medium for storing such program codes, constitute the present invention.

As a storage medium for storing such program codes, for example, a floppy disk, a hard disk, an optical disk, a magneto-optical disk, a CD-ROM, a magnetic tape, a non-volatile memory card, a ROM, and so on can be used.

It also is within the scope of this invention for the above-described program codes to operate in conjunction with an OS (operating system) or another application software, to provide the above-described functions of this invention.

Furthermore, it also is within the scope of the present invention for a function expansion board or a function expansion unit of a computer, CPU, or the like, to at least partially perform processing according to the instructions of the program codes, after the supplied program codes are written into a memory provided in the function expansion board/unit.

As has described above, according to the present invention, when compression using a wavelet transform is performed on an image, it is possible to minimize the amount of memory storage capacity necessary for performing the transform. That is, by performing a sub-band division of a special wavelet transform in accordance with the above-described techniques of this invention, it is possible to substantially reduce the memory storage capacity traditionally required for performing the transform.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image processing apparatus, comprising:
   detection means for detecting the size of image data to be coded;
   first transform means for frequency-transforming, in a one-dimensional direction, said image data to be coded;
   second transform means for further frequency-transforming, in a different one-dimensional direction, all of the frequency components obtained by said first transform means when said detected size is smaller than a predetermined size, and for further frequency-transforming, in the different one-dimensional direction, at least some of the frequency components obtained by said first transform means when said detected size is equal to or larger than said predetermined size; and
   coding means for entropy-coding frequency components obtained by said second transform means, and for entropy-coding frequency components which are not frequency transformed by said second transform means among the frequency components obtained by said first transform means.

2. An image processing apparatus according to claim 1, wherein said first transform means performs a frequency transform in an input direction of said image data to be coded.

3. An image processing apparatus according to claim 1, wherein said first transform means performs a frequency transform in a horizontal direction of said image data to be coded.

4. An image processing apparatus according to claim 1, wherein said second transform means performs a frequency transform in a direction perpendicular to the input direction of said image data to be coded.

5. An image processing apparatus according to claim 1, wherein said second transform means frequency-transforms, in the different one-dimensional direction, only low-frequency components of the frequency components obtained by said first transform means, when said detected size is equal to or greater than said predetermined size.

6. An image processing apparatus according to claim 1, wherein said second transform means frequency-transforms, in the different one-dimensional direction, only high-frequency components of the frequency components obtained by said first transform means, when said detected size is equal to or greater than said predetermined size.

7. An image processing apparatus according to claim 1, further comprising a third transform means for further frequency-transforming at least some of the frequency components obtained by said second transform means, and wherein said coding means also entropy-codes frequency components obtained by said third transform means.

8. An image processing apparatus according to claim 1, wherein said first and second transform means each perform a one-dimensional wavelet transform.

9. An image processing apparatus according to claim 1, wherein the entropy-coding performed by said coding means is Golomb coding.

10. An image processing method, comprising:
    a detection step, of detecting the size of image data to be coded;
    a first transform step, of frequency-transforming, in a one-dimensional direction, image data to be coded;
    a second transform step, of further frequency-transforming, in a different one-dimensional direction, all of the frequency components obtained in said first transform step when the detected size is smaller than a predetermined size, and of frequency-transforming, in the different one-dimensional direction, at least some of the frequency components obtained in said first transform step when the detected size is equal to or greater than the predetermined size; and
    a coding step, of entropy-coding frequency components obtained in said second transform step, and of entropy-coding frequency components which are not frequency transformed in said second transform step among the frequency components obtained in said first transform step.

11. A computer-readable storage medium storing an image processing program comprising:
    code for detecting the size of image data to be coded;
    first transform code for frequency-transforming, in a one-dimensional direction, image data to be coded;
    second transform code for further frequency-transforming, in a different one-dimensional direction, all of the frequency components obtained by said first transform code when said detected size is smaller than a predetermined size, and for further frequency-transforming, in the different one-dimensional direction, at least some of the frequency components obtained by said first transform code when said detected size is equal to or greater than the predetermined size; and
    code for entropy-coding frequency components obtained by said second transform code, and for entropy-coding frequency components which are not frequency transformed by said second transform code among the frequency components obtained by said first transform code.

12. An image processing apparatus, comprising:
    input means for inputting the same image data to be coded a plurality of times;
    first transform means for frequency-transforming, in a one-dimensional direction, the image data input from said input means an N-th time in order to obtain a first frequency component;
    second transform means for frequency-transforming, in said one-dimensional direction, image data input from said input means an M-th time, M being greater than N, in order to obtain a second frequency component;

storage means for selectively storing either one of said first and second frequency components; and third transform means for frequency-transforming, in a different one-dimensional direction, one of the first and second frequency components stored in said storage means.

13. An image processing apparatus according to claim 12, wherein said first and second transform means each perform one-dimensional discrete wavelet transform.

14. An image processing apparatus according to claim 12, wherein said input means inputs the same image data to be coded two times, N corresponds to 1, and M corresponds to 2.

15. An image processing method, comprising:

an input step, of inputting the same image data to be coded a plurality of times;

a first transform step, of frequency-transforming, in a one-dimensional direction, the image data input an N-th time in order to obtain a first frequency component;

a second transform step, of frequency-transforming, in said one-dimensional direction, the image data input an M-th time, M being greater than N, in order to obtain a second frequency component;

a storing step, of selectively storing either one of said first and second frequency components in a storage means; and a third transform step, of frequency-transforming, in a different one-dimensional direction, one of the first or second frequency components stored in said storing step.

16. A computer-readable storage medium storing an image processing program comprising:

code for inputting the same image data to be coded a plurality of times;

first transform code for frequency-transforming, in a one-dimensional direction, the image data input an N-th time in order to obtain a first frequency component;

second transform code for frequency-transforming, in said one-dimensional direction, the image data input an M-th time, M being greater than N, in order to obtain a second frequency component;

code for selectively storing either one of said first and second frequency components in a storage means; and third transform code for frequency-transforming, in a different one-dimensional direction, one of the first or second frequency components stored in said storage means.

* * * * *

UNITED STATES PATENT AND TRADEMARK OFFICE
CERTIFICATE OF CORRECTION

| | |
|---|---|
| PATENT NO. | : 6,665,444 B1 |
| APPLICATION NO. | : 09/558654 |
| DATED | : December 16, 2003 |
| INVENTOR(S) | : Hiroshi Kajiwara |

It is certified that error appears in the above-identified patent and that said Letters Patent is hereby corrected as shown below:

ON THE TITLE PAGE [57] ABSTRACT

Line 5, "transforming," should read --invention includes a first transform unit for frequency - transforming,--.

COLUMN 2

Line 39, "n-th time" should read --N-th time--; and
    Line 42, "m-th time" should read --M-th time--.

COLUMN 8

Line 55, "the" (second occurrence) should be deleted.

COLUMN 12

Line 15, "here" should read --where--; and
    Line 15, "sub-and" should read --sub-band--.

COLUMN 13

Line 20, "he" should read --The--.

COLUMN 14

Line 55, "he" should read --the--.

COLUMN 16

Line 3, "10" should be deleted.

COLUMN 17

Line 26, "formation" should read --information--;
    Line 33, "what" should read --that--; and
    Line 44, "of" (second occurrence) should be deleted.

COLUMN 20

Line 14, "he" should be deleted.

UNITED STATES PATENT AND TRADEMARK OFFICE
CERTIFICATE OF CORRECTION

PATENT NO. : 6,665,444 B1
APPLICATION NO. : 09/558654
DATED : December 16, 2003
INVENTOR(S) : Hiroshi Kajiwara It is certified that error appears in the above-identified patent and that said Letters Patent is hereby corrected as shown below:

COLUMN 21

Line 5, "has described" should read --has been described--.

COLUMN 23

Line 4, "and third" should read --and ¶ third--.

Signed and Sealed this

Tenth Day of June, 2008

JON W. DUDAS
*Director of the United States Patent and Trademark Office*